US012647899B2

(12) United States Patent
Huang

(10) Patent No.: US 12,647,899 B2
(45) Date of Patent: Jun. 2, 2026

(54) METHOD FOR DETERMINING UPLINK POWER, METHOD FOR DETERMINING SCHEDULING INFORMATION, TERMINAL AND NETWORK SIDE DEVICE

(71) Applicant: DATANG MOBILE COMMUNICATIONS EQUIPMENT CO., LTD., Beijing (CN)

(72) Inventor: Qiuping Huang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 505 days.

(21) Appl. No.: 17/916,301

(22) PCT Filed: Apr. 1, 2021

(86) PCT No.: PCT/CN2021/084906
§ 371 (c)(1),
(2) Date: Sep. 30, 2022

(87) PCT Pub. No.: WO2021/197416
PCT Pub. Date: Jul. 10, 2021

(65) Prior Publication Data
US 2023/0142271 A1     May 11, 2023

(30) Foreign Application Priority Data

Apr. 2, 2020     (CN) .......................... 202010254631.1

(51) Int. Cl.
*H04W 52/14*     (2009.01)
*H04W 52/36*     (2009.01)
(52) U.S. Cl.
CPC ......... *H04W 52/146* (2013.01); *H04W 52/36* (2013.01)

(58) Field of Classification Search
CPC . H04W 52/146; H04W 52/36; H04W 52/362; H04W 72/1268; H04W 72/23;
(Continued)

(56) References Cited

U.S. PATENT DOCUMENTS 12,413,281 B2 * 9/2025 Zhang ................... H04L 5/0048
2013/0128833 A1 5/2013 Lee et al.
(Continued)

FOREIGN PATENT DOCUMENTS

CN     101674642 A     3/2010
CN     104812043 A     7/2015
(Continued)

OTHER PUBLICATIONS

International Preliminary Report on Patentability issued Sep. 29, 2022 including Written Opinion and International Search Report in International Application No. PCT/CN2021/084906.
(Continued)

*Primary Examiner* — Angelica Perez
(74) *Attorney, Agent, or Firm* — Harness, Dickey & Pierce, P.L.C.

(57)     ABSTRACT

A method for determining uplink power and scheduling information, a terminal and a network side device are provides. The method includes obtaining scheduling information of an uplink signal, wherein the scheduling information at least indicates related information of Q subbands, Q is a positive integer; determining a first power scaling coefficient according to the scheduling information; determining transmission power of the uplink signal according to the first power scaling coefficient.

14 Claims, 2 Drawing Sheets

(58) Field of Classification Search
    CPC .. H04W 72/21; H04W 52/247; H04B 7/0456;
                                                    Y02D 30/70
    See application file for complete search history.

(56) References Cited

U.S. PATENT DOCUMENTS

| | | | | |
|---|---|---|---|---|
| 2018/0368083 | A1* | 12/2018 | Yang | H04B 7/0486 |
| 2019/0327693 | A1* | 10/2019 | Rahman | H04W 52/42 |
| 2019/0364546 | A1 | 11/2019 | Kwak et al. | |
| 2020/0083939 | A1 | 3/2020 | Park et al. | |
| 2021/0399773 | A1 | 12/2021 | Huang et al. | |
| 2022/0015039 | A1* | 1/2022 | Huang | H04W 52/367 |
| 2022/0094404 | A1* | 3/2022 | Yao | H04B 7/0482 |
| 2022/0150841 | A1* | 5/2022 | Sun | H04L 5/0048 |
| 2022/0353827 | A1* | 11/2022 | Okamura | H04B 7/0456 |
| 2023/0008524 | A1* | 1/2023 | Okamura | H04L 5/0048 |

FOREIGN PATENT DOCUMENTS

| | | | | | |
|---|---|---|---|---|---|
| CN | 109644027 | A | | 4/2019 | |
| CN | 109690962 | A | * | 4/2019 | H04B 7/0639 |
| CN | 110463066 | A | | 11/2019 | |
| EP | 3579447 | A1 | | 12/2019 | |
| TW | 202013904 | A | | 4/2020 | |
| WO | WO-2018/226581 | A1 | | 12/2018 | |
| WO | WO-2019/203619 | A1 | | 10/2019 | |

OTHER PUBLICATIONS

First Office Action issued Nov. 9, 2021 in Taiwanese Application No. 110112025.
Extended European Search Report dated Aug. 23, 2023 issued in related European patent application 21782402.8.

* cited by examiner

METHOD FOR DETERMINING UPLINK POWER, METHOD FOR DETERMINING SCHEDULING INFORMATION, TERMINAL AND NETWORK SIDE DEVICE

CROSS-REFERENCE TO RELATED APPLICATIONS

This application is the U.S. national phase of PCT Application No. PCT/CN2021/084906 filed on Apr. 1, 2021, which claims priorities of the Chinese patent application No. 202010254631.1 filed on Apr. 2, 2020, which are incorporated herein by reference in their entireties.

TECHNICAL FIELD

The present disclosure relates to the field of communications technology, in particular to a method for determining uplink power, a method for determining scheduling information, a terminal and a network side device.

BACKGROUND

In the related art, for a Physical uplink shared channel (PUSCH) based on a codebook, a network side device indicates to a User Equipment (UE) a wideband precoding matrix for PUSCH transmission. The same precoding matrix is used for PUSCH on all Physical resource blocks (PRBs) and therefore there is the same number of non-zero antenna ports. If different precoding matrices are allowed to be used for PUSCH in different subbands, and if the precoding matrices corresponding to different PRBs correspond to different numbers of non-zero antenna ports, the transmission power of the PUSCH cannot be determined.

SUMMARY

Embodiments of the present disclosure provide a method for determining uplink power and scheduling information, a terminal and a network side device, so as to solve the problem in the related art that when frequency selective precoding are performed on the uplink signal, the transmission power of the uplink signal cannot be determined.

An embodiment of the present disclosure provide a method for determining uplink power, applied to a terminal, includes: obtaining scheduling information of an uplink signal, wherein the scheduling information at least indicates related information of Q subbands, Q is a positive integer; determining a first power scaling coefficient according to the scheduling information; determining transmission power of the uplink signal according to the first power scaling coefficient.

Optionally, before the obtaining scheduling information of an uplink signal, the method further includes: obtaining a transmission power control rule of the uplink signal; the determining a first power scaling coefficient according to the scheduling information includes: determining the first power scaling coefficient according to the scheduling information and the transmission power control rule of the uplink signal.

Optionally, the determining a first power scaling coefficient according to the scheduling information includes: determining at least one of a precoding matrix, a number of non-zero antenna ports, or a number Q of subbands for non-zero transmission of the uplink signal according to the scheduling information; determining the first power scaling coefficient according to at least one of the precoding matrix, the number of non-zero antenna ports, or the number Q of subbands.

Optionally, the first power scaling coefficient includes at least one of power scaling coefficients of the Q subbands and a power scaling coefficient of the uplink signal.

Optionally, in the case that the first power scaling coefficient includes the power scaling coefficients of the Q subbands, the determining the first power scaling coefficient according to at least one of the precoding matrix, the number of non-zero antenna ports, or the number Q of subbands includes: determining the power scaling coefficient of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes power scaling coefficients of the Q subbands, after determining the first power scaling coefficient according to at least one of the precoding matrix, the number of non-zero antenna ports, or the number Q of subbands, the method further includes: determining the power scaling coefficient of the uplink signal according to the power scaling coefficients of the Q subbands.

Optionally, when Q>1, the determining the power scaling coefficient of the uplink signal according to the power scaling coefficients of the Q subbands includes: determining the power scaling coefficient of the uplink signal according to a minimum power scaling coefficient among the power scaling coefficients of the Q subbands; or, determining the power scaling coefficient of the uplink signal according to a power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, the determining the first power scaling coefficient according to at least one of the precoding matrix, the number of non-zero antenna ports, or the number Q of subbands includes: determining the power scaling coefficient of the uplink signal according to a minimum number of non-zero antenna ports among the numbers of non-zero antenna ports of the subbands.

Optionally, when there are more than one non-zero antenna ports, the determining the transmission power of the uplink signal according to the first power scaling coefficient includes: determining a first non-zero antenna port according to the first power scaling coefficient and a number of resource elements (REs) for the non-zero transmission of the uplink signal corresponding to the non-zero antenna ports; determining transmission power of the first non-zero antenna port on one non-zero transmitted RE according to the first power scaling coefficient.

Optionally, after determining transmission power of the first non-zero antenna port on one non-zero transmitted RE, the determining the transmission power of the uplink signal further includes: determining the transmission power of the first non-zero antenna port on all non-zero transmitted REs of the first non-zero antenna port according to the transmission power of the first non-zero antenna port on one non-zero transmitted RE; or, determining transmission power of other non-zero antenna ports on each non-zero transmitted RE of the other non-zero antenna ports, according to the transmission power of the first non-zero antenna port on one non-zero transmitted RE; wherein, the other non-zero antenna ports are non-zero antenna ports other than the non-zero antenna port with the maximum number of REs.

Optionally, when there are more than one non-zero antenna ports, the determining the transmission power of the uplink signal according to the first power scaling coefficient includes: determining the transmission power of each non-zero antenna port on each non-zero transmitted RE of the each non-zero antenna port according to the first power scaling coefficient; determining the transmission power of each non-zero antenna port corresponding to the Q sub-bands on each non-zero transmitted RE according to a minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the determining the transmission power of the uplink signal further comprises any one of the following: determining transmission power of the uplink signal in each subband according to the total transmission power of the uplink signal and the number Q of subbands, wherein Q>1; or determining transmission power of the uplink signal of each non-zero antenna port according to the total transmission power of the uplink signal and the number of the non-zero antenna ports, wherein there are more than one non-zero antenna ports.

Optionally, wherein the determining the transmission power of the uplink signal in each subband according to the total transmission power of the uplink signal and the number Q of subbands includes: dividing evenly the transmission power of the uplink signal into each subband according to the total transmission power of the uplink signal and the number Q of the subbands; the determining the transmission power of the uplink signal of each non-zero antenna port according to the total transmission power of the uplink signal and the number of non-zero antenna ports, includes any one of the following: dividing evenly the transmission power of the uplink signal into each non-zero antenna port according to the total transmission power of the uplink signal and the number of non-zero antenna ports; determining the transmission power of the uplink signal of each non-zero antenna port according to the total transmission power of the uplink signal and a proportion of a number of non-zero antenna ports corresponding to each sub-band to a number of all non-zero antenna ports corresponding to each sub-band; determining the transmission power of the uplink signal of each non-zero antenna port according to the total transmission power of the uplink signal and a proportion of a number of non-zero elements corresponding to each nonzero antenna port in a precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the determining the transmission power of the uplink signal includes any of the following: dividing evenly the transmission power of the uplink signal into the non-zero antenna ports according to the transmission power of the uplink signal in the Q subbands and the number of non-zero antenna ports corresponding to the Q subbands; determining the transmission power of the uplink signal of each non-zero antenna port corresponding to each subband according to the transmission power of the uplink signal in the Q sub-bands and a proportion of a number of each non-zero antenna port corresponding to the Q sub-bands to a number of all non-zero antenna ports corresponding to the Q sub-bands, wherein Q>1; determining the transmission power of the uplink signal of each non-zero antenna port corresponding to the Q subbands according to the transmission power of the uplink signal in the Q subbands and a proportion of a number of non-zero elements corresponding to each non-zero antenna port included in a precoding matrix corresponding to the Q subbands to a number of all non-zero elements in the precoding matrix.

Some embodiments of the present disclosure provides a method for determining scheduling information, applied to a network side device, includes: determining scheduling information of an uplink signal according to a preset transmission power control rule of the uplink signal, wherein the scheduling information at least indicates related information of Q subbands, Q is a positive integer; transmitting the scheduling information to a terminal; the transmission power control rule of the uplink signal includes: determining, by the terminal, a first power scaling coefficient according to the scheduling information; determining, by the terminal, transmission power of the uplink signal according to the first power scaling coefficient.

Optionally, before transmitting the scheduling information to the terminal, the method further includes: transmitting the transmission power control rule of the uplink signal to the terminal; the determining, by the terminal, the first power scaling coefficient according to the scheduling information, includes: determining, by the terminal, the first power scaling coefficient according to the scheduling information and the transmission power control rule of the uplink signal.

Optionally, the determining, by the terminal, the first power scaling coefficient according to the scheduling information, includes: determining, by the terminal, at least one of a precoding matrix, a number of non-zero antenna ports, or a number Q of subbands for non-zero transmission of the uplink signal according to the scheduling information; determining, by the terminal, the first power scaling coefficient according to at least one of the precoding matrix, the number of non-zero antenna ports, or the number Q of subbands.

Optionally, the first power scaling coefficient includes at least one of power scaling coefficients of the Q subbands and a power scaling coefficient of the uplink signal.

Optionally, in the case that the first power scaling coefficient includes the power scaling coefficients of Q subbands, the determining the first power scaling coefficient according to at least one of the precoding matrix, the number of non-zero antenna ports, or the number Q of subbands includes: determining the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes power scaling coefficients of the Q subbands, after determining, by the terminal, the first power scaling coefficient according to at least one of the precoding matrix, the number of non-zero antenna ports, or the number Q of subbands, the method further includes: determining, by the terminal, the power scaling coefficient of the uplink signal according to the power scaling coefficients of the Q subbands.

Optionally, when Q>1, the determining, by the terminal, the power scaling coefficient of the uplink signal according to the power scaling coefficients of the Q subbands includes: determining, by the terminal, the power scaling coefficient of the uplink signal according to a minimum power scaling coefficient among the power scaling coefficients of the Q subbands; or, determining, by the terminal, the power scaling coefficient of the uplink signal according to a power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, the determining the first power scaling coefficient according to at least one of the precoding matrix, the number of non-zero antenna ports, and the number Q of subbands includes: determining, by the terminal, the power scaling coefficient of the uplink signal according to a minimum number of non-zero antenna ports among the numbers of non-zero antenna ports of the subbands.

Optionally, when there are more than one non-zero antenna ports, the determining, by the terminal, the transmission power of the uplink signal according to the first power scaling coefficient includes: determining, by the terminal, a first non-zero antenna port according to the first power scaling coefficient and a number of resource elements (REs) for the non-zero transmission of the uplink signal corresponding to the non-zero antenna ports; determining, by the terminal, transmission power of the first non-zero antenna port on one non-zero transmitted RE according to the first power scaling coefficient.

Optionally, after determining the transmission power of the first non-zero antenna port on a non-zero transmitted RE, the determining, by the terminal, the transmission power of the uplink signal further includes: determining, by the terminal, the transmission power of the first non-zero antenna port on all non-zero transmitted REs of the first non-zero antenna port according to the transmission power of the first non-zero antenna port on one non-zero transmitted RE; or, determining, by the terminal, transmission power of other non-zero antenna ports on each non-zero transmitted RE of the other non-zero antenna ports according to the transmission power of the first non-zero antenna port on a non-zero transmitted RE; wherein, the other non-zero antenna ports are non-zero antenna ports other than the non-zero antenna ports with the maximum number of REs.

Optionally, in the case that there are more than one non-zero antenna ports, the determining, by the terminal, the transmission power of the uplink signal according to the first power scaling coefficient, includes: determining, by the terminal, the transmission power of each non-zero antenna port on each non-zero transmitted RE of the each non-zero antenna port according to the first power scaling coefficient; determining, by the terminal, the transmission power of each non-zero antenna port corresponding to the Q sub-bands on each non-zero transmitted RE according to a minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the determining, by the terminal, the transmission power of the uplink signal includes any one of the following: determining, by the terminal, transmission power of the uplink signal in each subband according to the total transmission power of the uplink signal and the number Q of subbands, wherein Q>1; or determining, by the terminal, transmission power of the uplink signal of each non-zero antenna port according to the total transmission power of the uplink signal and the number of the non-zero antenna ports, wherein there are more than one non-zero antenna ports.

Optionally, the determining, by the terminal, the transmission power of the uplink signal in each subband according to the total transmission power of the uplink signal and the number Q of subbands, includes: dividing, by the terminal, evenly the transmission power of the uplink signal into each subband according to the total transmission power of the uplink signal and the number Q of the subbands; the determining, by the terminal, the transmission power of the uplink signal of each non-zero antenna port according to the total transmission power of the uplink signal and the number of non-zero antenna ports, includes any of the following: dividing, by the terminal, evenly the transmission power of the uplink signal into each non-zero antenna port according to the total transmission power of the uplink signal and the number of non-zero antenna ports; determining, by the terminal, the transmission power of the uplink signal of each non-zero antenna port according to the total transmission power of the uplink signal and a proportion of a number of non-zero antenna ports corresponding to each sub-band to a number of all non-zero antenna ports corresponding to each sub-band; determining, by the terminal, the transmission power of the uplink signal of each non-zero antenna port according to the total transmission power of the uplink signal and a proportion of a number of non-zero elements corresponding to each non-zero antenna port in a precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the determining, by the terminal, the transmission power of the uplink signal includes any of the following: dividing, by the terminal, evenly the transmission power of the uplink signal into the non-zero antenna ports according to the transmission power of the uplink signal in the Q subbands and the number of non-zero antenna ports corresponding to the Q subbands; determining, by the terminal, the transmission power of the uplink signal of each non-zero antenna port corresponding to each subband according to the transmission power of the uplink signal in the Q sub-bands and a proportion of a number of each non-zero antenna port corresponding to the Q sub-bands to a number of all non-zero antenna ports corresponding to the Q sub-bands, wherein Q>1; determining, by the terminal, the transmission power of the uplink signal of each non-zero antenna port corresponding to the Q subbands according to the transmission power of the uplink signal in the Q sub-bands and a proportion of a number of non-zero elements corresponding to each non-zero antenna port included in a precoding matrix corresponding to the Q subbands to a number of all non-zero elements in the precoding matrix.

Some embodiments of the present disclosure provide a terminal, includes: a transceiver, a memory, a processor, and a computer program stored in the memory and executed by the processor, wherein the processor implements the following steps when executing the computer program: obtaining scheduling information of an uplink signal, wherein the scheduling information at least indicates related information of Q subbands, Q is a positive integer; determining a first power scaling coefficient according to the scheduling information; determining transmission power of the uplink signal according to the first power scaling coefficient.

Optionally, the processor implements the following steps when executing the computer program: obtaining a transmission power control rule of the uplink signal;

the processor implements the following steps when executing the computer program: determining the first power scaling coefficient according to the scheduling information and the transmission power control rule of the uplink signal.

Optionally, the processor implements the following steps when executing the computer program: determining at least one of a precoding matrix, a number of non-zero antenna ports, or a number Q of subbands for non-zero transmission of the uplink signal according to the scheduling information; determining the first power scaling coefficient according to at least one of the precoding matrix, the number of non-zero antenna ports, or the number Q of subbands.

Optionally, the first power scaling coefficient includes at least one of power scaling coefficients of the Q subbands and a power scaling coefficient of the uplink signal.

Optionally, in the case that the first power scaling coefficient includes the power scaling coefficient of the Q subbands, the processor implements the following steps when executing the computer program: determining the power scaling coefficient of the uplink signal according to the power scaling coefficients of the Q subbands.

Optionally, when the number of the non-zero antenna ports is multiple, the processor implements the following steps when executing the computer program: determining a first non-zero antenna port according to the first power scaling coefficient and a number of resource elements (REs) for the non-zero transmission of the uplink signal corresponding to the non-zero antenna ports; determining transmission power of the first non-zero antenna port on one non-zero transmitted RE according to the first power scaling coefficient.

Optionally, the processor implements the following steps when executing the computer program: determining the transmission power of the first non-zero antenna port on all non-zero transmitted REs of the first non-zero antenna port according to the transmission power of the first non-zero antenna port on one non-zero transmitted RE; or, determining transmission power of other non-zero antenna ports on each non-zero transmitted RE of the other non-zero antenna ports, according to the transmission power of the first non-zero antenna port on one non-zero transmitted RE; wherein, the other non-zero antenna ports are non-zero antenna ports other than the non-zero antenna port with the maximum number of REs.

Optionally, when there are more than one non-zero antenna ports, the processor implements the following steps when executing the computer program: determining the transmission power of each non-zero antenna port on each non-zero transmitted RE of the each non-zero antenna port according to the first power scaling coefficient; determining the transmission power of each non-zero antenna port corresponding to the Q sub-bands on each non-zero transmitted RE according to a minimum transmission power among the transmission power of each non-zero antenna port corresponding to each sub-band in the Q sub-bands on each non-zero transmitted RE.

Some embodiments of the present disclosure provides a network side device, includes: a transceiver, a memory, a processor, and a computer program stored in the memory and executed by the processor, wherein the processor implements the following steps when executing the computer program: determining scheduling information of an uplink signal according to a preset transmission power control rule of the uplink signal, wherein the scheduling information at least indicates related information of Q subbands, Q is a positive integer; transmitting the scheduling information to a terminal; the transmission power control rule of the uplink signal includes: determining, by the terminal, a first power scaling coefficient according to the scheduling information; determining, by the terminal, transmission power of the uplink signal according to the first power scaling coefficient.

Optionally, when the processor executes the computer program, any one of the following steps is implemented: transmitting the transmission power control rule of the uplink signal to the terminal; the determining, by the terminal, the first power scaling coefficient according to the scheduling information, includes: determining, by the terminal, the first power scaling coefficient according to the scheduling information and the transmission power control rule of the uplink signal.

Optionally, the determining, by the terminal, the first power scaling coefficient according to the scheduling information, includes: determining, by the terminal, at least one of a precoding matrix, a number of non-zero antenna ports, or a number Q of subbands for non-zero transmission of the uplink signal according to the scheduling information; determining, by the terminal, the first power scaling coefficient according to at least one of the precoding matrix, the number of non-zero antenna ports, or the number Q of subbands.

Optionally, the first power scaling coefficient includes at least one of power scaling coefficients of the Q subbands and a power scaling coefficient of the uplink signal.

Optionally, in the case that the first power scaling coefficient includes power scaling coefficients of the Q sub-bands, after determining, by the terminal, the first power scaling coefficient according to at least one of the precoding matrix, the number of non-zero antenna ports, or the number Q of subbands, the method further includes: determining, by the terminal, the power scaling coefficient of the uplink signal according to the power scaling coefficients of the Q subbands.

Optionally, when there are more than one non-zero antenna ports, the determining, by the terminal, the transmission power of the uplink signal according to the first power scaling coefficient includes: determining, by the terminal, a first non-zero antenna port according to the first power scaling coefficient and a number of resource elements (REs) for the non-zero transmission of the uplink signal corresponding to the non-zero antenna ports; determining, by the terminal, transmission power of the first non-zero antenna port on one non-zero transmitted RE according to the first power scaling coefficient.

Optionally, after determining the transmission power of the first non-zero antenna port on a non-zero transmitted RE, the determining, by the terminal, the transmission power of the uplink signal further includes: determining, by the terminal, the transmission power of the first non-zero antenna port on all non-zero transmitted REs of the first non-zero antenna port according to the transmission power of the first non-zero antenna port on one non-zero transmitted RE; or, determining, by the terminal, transmission power of other non-zero antenna ports on each non-zero transmitted RE of the other non-zero antenna ports according to the transmission power of the first non-zero antenna port on a non-zero transmitted RE; wherein, the other non-zero antenna ports are non-zero antenna ports other than the non-zero antenna ports with the maximum number of REs.

Optionally, in the case that there are more than one non-zero antenna ports, the determining, by the terminal, the transmission power of the uplink signal according to the first power scaling coefficient, includes: determining, by the terminal, the transmission power of each non-zero antenna port on each non-zero transmitted RE of the each non-zero antenna port according to the first power scaling coefficient; determining, by the terminal, the transmission power of each non-zero antenna port corresponding to the Q sub-bands on each non-zero transmitted RE according to a minimum transmission power among the transmission power of each non-zero antenna port corresponding to each sub-band in the Q sub-bands on each non-zero transmitted RE.

Some embodiments of the present disclosure provides a terminal, includes: a first obtaining module, configured to obtain scheduling information of an uplink signal, wherein the scheduling information at least indicates related information of Q subbands, Q is a positive integer; a first determining module, configured to determine a first power scaling coefficient according to the scheduling information; a second determining module, configured to determine transmission power of the uplink signal according to the first power scaling coefficient.

Some embodiments of the present disclosure provides a network side device, includes: a third determining module, configured to determine scheduling information of an uplink signal according to a preset transmission power control rule of the uplink signal, wherein the scheduling information at least indicates related information of Q subbands, Q is a positive integer; a first transmitting module, configured to transmit the scheduling information to a terminal; the transmission power control rule of the uplink signal includes: determining, by the terminal, a first power scaling coefficient according to the scheduling information; determining, by the terminal, transmission power of the uplink signal according to the first power scaling coefficient.

Some embodiments of the present disclosure provides a computer-readable storage medium on which a computer program is stored, and the program is executed by a processor to implement the steps in the method for determining uplink power, or the steps in the method for determining scheduling information.

The technical solution of the present disclose achieves the following beneficial effect:

A terminal obtains scheduling information of an uplink signal, wherein the scheduling information at least indicates related information of Q subbands, Q is a positive integer; a first power scaling coefficient is determined according to the scheduling information; transmission power of the uplink signal is determined according to the first power scaling coefficient, so as to solve the problem in the related art that when frequency selective precoding are performed on the uplink signal, the transmission power of the uplink signal cannot be determined.

DETAILED DESCRIPTION

Figure 1:
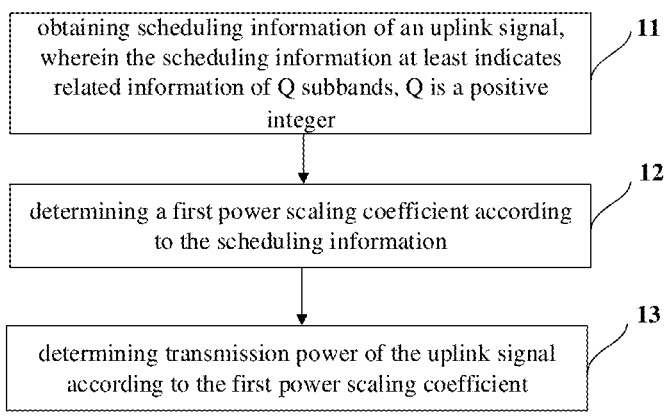
FIG. 1 shows a flowchart of a method for determining uplink power according to some embodiments of the present disclosure.

In order to make the technical problems, technical solutions and advantages to be solved by the present disclosure more clear, detailed description will be given below with reference to the accompanying drawings and specific embodiments. In the following description, specific details such as specific configurations and components are provided merely to assist in a comprehensive understanding of embodiments of the present disclosure. Accordingly, it should be apparent to those skilled in the art that various changes and modifications of the embodiments described herein can be made without departing from the scope and spirit of the present disclosure. Also, descriptions of well-known functions and constructions are omitted for clarity and conciseness.

It is to be understood that reference throughout the disclosure to "one embodiment" or "an embodiment" means that a particular feature, structure or characteristic associated with the embodiment is included in at least one embodiment of the present disclosure. Thus, appearances of "in one embodiment" or "in an embodiment" throughout this disclosure are not necessarily referring to the same embodiment. Furthermore, the particular features, structures or characteristics may be combined in any suitable manner in one or more embodiments.

In various embodiments of the present disclosure, it should be understood that the value of the sequence numbers of the following processes does not imply the sequence of execution, and the execution sequence of each process should be determined by its functions and internal logic, the implementation of the present disclosure is not limited.

Additionally, the terms "system" and "network" are often used interchangeably herein.

In the embodiments provided in the present disclosure, determining B according to A does not mean that B is only determined according to A, and B may also be determined according to A and other information.

In the embodiments provided in the present disclosure, it should be understood that "A contains B" means that A may contain B, and A may also contain C and/or D, etc. In the embodiments of the present disclosure, it should be understood that "A includes B" means that A may include B, and A may also include C and/or D, etc.

The wireless communication system includes a terminal and a network side device. The terminal may also be called a terminal device or a user equipment (UE), and the terminal may be a mobile phone, a tablet personal computer, a laptop computer, a personal digital assistant (PDA)), Mobile Internet Device (MID), Wearable Device, or vehicle-mounted device and other terminal side devices. It should be noted that, in some embodiments of the present disclosure, the specific type of the terminal is not limited. The network side device may be a base station or a core network, wherein the above-mentioned base station may be a base station of 5G and later versions (for example: gNB, 5G NR NB, etc.), or a base station in other communication systems (for example: eNB, WLAN access point, or other access points, etc.), a base station may be referred to as a Node B, an evolved Node B, an access point, a Base Transceiver Station (BTS), a radio base station, a radio transceiver, a Basic Service Set (BSS), Extended Service Set (ESS), Node B, Evolved Node B (eNB), Home Node B, Home Evolved Node B, WLAN Access Point, WiFi Node or some other suitable terms in the field, as long as the same technical effect is achieved, the base station is not limited to a specific technical vocabulary. It should be noted that in some embodiments of the present disclosure, only the base station in the NR system is used as an example, but the specific type of base station is not limited.

In order to enable those skilled in the art to better understand the technical solutions of some embodiments of the present disclosure, the following descriptions are first made.

In existing wireless communication systems such as Long Term Evolution (LTE) system and New Radio (NR) system, the Multiple Input Multiple Output (MIMO) transmission of uplink signals only supports broadband precoding, does not support subband precoding. For example, under the codebook-based PUSCH uplink transmission scheme, the network side device can only indicate to the UE broadband SRS resource indication information (for example, through the SRS resource indication field in Downlink Control Information (DCI) or Radio Resource Control (RRC) signaling SRS-ResourceIndicator), transmission precoding index indicator (TPMI) and the number of transport streams (for example, through the precoding information and number of layers field in DCI or RRC signaling Precoding and number of layers). When transmitting PUSCH, the UE uses the same analog beamforming, precoding matrix and number of transport streams on all scheduled frequency domain resources (precoding matrix and number of transport streams determined based on bandwidth TMPI and the number of the transport streams indicated by the network side device).

For another example, in the non-codebook-based PUSCH uplink transmission scheme, the network side device indicates the UE a wideband SRI (for example, through the SRS resource indicator field in the DCI or the RRC signaling SRS-ResourceIndicator). When transmitting the PUSCH, the UE uses the same analog beamforming, precoding matrix and number of transport streams (determined according to the SRI indicated by the network side device) on all scheduled frequency domain resources.

The existing PUSCH power control scheme is that: if the PUSCH is a codebook-based transmission mode, and the number of antenna ports included in at least one SRS resource included in the SRS resource set corresponding to the transmission mode (the SRS resource set for which the high-level signaling parameter "usage" is "codebook") is greater than 1, then the transmission power value of PUSCH is a power value obtained after scaling the power calculated according to the power control formula of PUSCH, otherwise, the transmission power value of PUSCH is the power value calculated by the power control formula of PUSCH; wherein, the scaling ratio is a function of the number of non-zero antenna ports of PUSCH, and the transmission power of PUSCH is evenly distributed on the non-zero antenna ports of PUSCH.

Subband precoding can bring selective precoding gain in frequency domain and improve the performance of uplink signal transmission. If subband precoding is performed on PUSCH, PUSCH may use different precoding matrices in different subbands, so there may be different numbers of non-zero antenna ports in different subbands, distribution of power cannot be determined when performing subband precoding on PUSCH, if PUSCH is allowed to use different precoding matrices in different subbands, then if the precoding matrices corresponding to different PRBs correspond to different numbers of non-zero antenna ports, if the transmission power of PUSCH is still evenly distributed on all non-zero antennas ports, which will lead to high transmission power on some PRBs and low transmission power on some PRBs, high error rates for some PRBs, and may increase the peak-to-average ratio of PUSCH, and affect the performance.

In some embodiments of the present disclosure, the wideband corresponds to all frequency domain resources to which the uplink signal is allocated. The broadband-related information may also be referred to as broadband information, which may be applicable to all resources on which uplink signals are scheduled. Taking the precoding matrix indication information as an example, if the network side device indicates the UE a wideband precoding matrix indication information, the precoding matrix indicated by the indication information is used for all frequency domain resources of the uplink signal. The wideband precoding in some embodiments of the present disclosure refers to using the same precoding on all frequency domain resources of the uplink signal.

One subband is P consecutive PRBs, or P consecutive virtual resource blocks (VRBs), which are part of the frequency domain resources allocated to the uplink signal. The size of the subband and/or the dividing mode of the subband may be indicated by the network side device to the terminal through signaling (for example, the network side device may directly indicate the value of P to the terminal, or P may be obtained through other terminals), or can be pre-agreed in the protocol. The subband information of different subbands may be the same or different. The network side device may separately indicate subband information for each subband. For example, if the number of transport streams is broadband information, the number of the transport streams is used for all resources on which the uplink signal is scheduled. Subband-related information may also be referred to as subband information, which may be applicable to the subband in which the uplink signal is scheduled. Subband information for one subband is information applicable to the subband. Still taking the precoding matrix indication information as an example, if the network side device indicates the precoding matrix indication information about a certain subband to the UE, the precoding matrix indicated by the indication information is used for the frequency domain corresponding to the subband in which the uplink signal is located. Subband precoding in some embodiments of the present disclosure means that uplink signals may use precoding matrices in different subbands respectively, that is, the precoding matrices used in each subband may be the same or different. That is to say, the network side device may separately indicate the precoding matrix for each subband, instead of using the same precoding matrix for all frequency domain resources of the uplink signal.

Therefore, the embodiments of the present disclosure provide a method for determining uplink power and scheduling information, a terminal, and a network side device, which solve the problem that the transmission power of the uplink signal cannot be determined when frequency selective precoding is performed on the uplink signal in the related art.

Specifically, as shown in FIG. 1, an embodiment of the present disclosure provides a method for determining uplink power, which is applied to a terminal, and specifically includes the following steps:

Step 11: Obtaining scheduling information of an uplink signal, wherein the scheduling information at least indicates related information of Q subbands, Q is a positive integer.

Specifically, the scheduling information is information indicating how the uplink signal should be transmitted, and the scheduling information may include but is not limited to at least one of the following information: precoding matrix indication information, transport stream number indication information, uplink signal resource allocation information or SRS resource indication information, etc.

It should be noted that the related information of the Q subbands may be a precoding matrix corresponding to the subband, or may also be the number of transport streams corresponding to the subband, or may be SRS resource indication information corresponding to the subband, or may also be a combination of a precoding matrix, the number of transport streams, and SRS resource indication information. Wherein, Q is a positive integer greater than or equal to 1. It should be noted that the number of transport streams is sometimes referred to as the number of layers, and the transport streams are sometimes referred to as layers.

It should be noted that the uplink signal includes but is not limited to at least one of the following: a PUSCH signal, a demodulation reference signal (DMRS), a physical uplink control channel (PUCCH) signal, a physical random access channel (PRACH) signal, or SRS, etc.

The scheduling information of the uplink signal may be indicated to the terminal by the network side device. The scheduling information of the uplink signal may also be obtained by the terminal according to a certain criterion.

Step 12: Determining a first power scaling coefficient according to the scheduling information.

Optionally, the first power scaling coefficient includes at least one of a power scaling coefficients of the Q subbands and a power scaling coefficient of the uplink signal. Optionally, the terminal determines the power scaling coefficients of the Q subbands according to the scheduling information, where Q is the number of subbands of the uplink signal, and the power scaling coefficients of the Q subbands correspond to each subband in which the uplink signal is scheduled. Q is a positive integer. When Q is equal to 1, the first power scaling coefficient is the power scaling coefficient of one subband; when Q is greater than 1, for example: Q is equal to 2, the first subband corresponds to a power scaling coefficient, the second subband corresponds to another power scaling coefficient.

It should be understood that the Q subbands may be all subbands of the uplink signal, or may be part of the subbands of the uplink signal. When the Q subbands are part of the subbands of the uplink signal, the terminal may need to determine the power of the uplink signal in other subbands according to the related information of these subbands. Of course, the terminal may also acquire related information of other subbands, and determine the power of the uplink signal in the other subbands according to the related information of the other subbands.

It should be understood that the power scaling coefficient corresponding to one subband is not necessarily a coefficient for scaling the power of the uplink signal (for example, the power calculated according to the power control formula of the uplink signal) when the uplink signal is transmitted in the subband. That is to say, when the uplink signal is transmitted in one subband, it is possible to use the power scaling coefficient of the subband to scale the power of the uplink signal. It is also possible that when the uplink signal is transmitted in one subband, the power scaling is not performed using the power scaling coefficient of the subband, but the power scaling is performed by using the power scaling coefficient of another subband. Another coefficient may be determined based on the power scaling coefficient of the uplink signal in one or more subbands.

The power scaling coefficient of the uplink signal is a coefficient for scaling the power of the uplink signal, including but not limited to one or more of the following: a coefficient for scaling total power of the uplink signal; a coefficient for scaling power of the uplink signal in the subband; a coefficient for scaling power of the uplink signal antenna port; a coefficient for scaling a resource element (RE) of the uplink signal.

Step 13: Determining transmission power of the uplink signal according to the first power scaling coefficient.

Optionally, the step 13 includes:

determining the transmission power of the uplink signal according to a product of the first power scaling coefficient and first power;

The first power is the power obtained by the terminal according to the parameters of the uplink signal and/or a reference signal corresponding to the uplink signal.

Specifically, when the first power scaling coefficient is the power scaling coefficient of the uplink signal, the total transmission power of the uplink signal is the power obtained by multiplying the first power by the power scaling coefficient of the uplink signal. When the first power scaling coefficient is the power scaling coefficients of the Q subbands, the transmission power of the Q subbands is the power obtained by multiplying the first power by the power scaling coefficients of the Q subbands. Particularly, when Q>1, the transmission power of each subband is equal to the power obtained by multiplying the power scaling coefficient of the subband by the power value of the first power. The first power is the power calculated by the terminal according to the parameters of the uplink signal (path loss, etc.) and/or the reference signal corresponding to the uplink signal. For example, when the uplink signal is PUSCH, the first power is the power calculated by the PUSCH power control calculation formula.

Optionally, the transmission power of the uplink signal is the power of the uplink signal (for example, the power calculated according to the power control formula of the uplink signal) after scaling by a first power scaling coefficient. Optionally, the transmission power of the uplink signal includes but is not limited to at least one of the following: total transmission power of the uplink signal, transmission power of the uplink signal in each subband, transmission power of the uplink signal in each non-zero antenna port, transmission power of the first non-zero antenna port on one non-zero transmitted RE, transmission power of a non-zero antenna port other than the non-zero antenna port with maximum number of REs on each non-zero transmitted RE of the other non-zero antenna ports, or transmission power of each non-zero antenna port corresponding to the Q subbands on each non-zero transmitted RE.

Optionally, the transmission power of the uplink signal includes but is not limited to one or more of the following: the total transmission power of the uplink signal may be the power of the uplink signal after scaling by a power scaling coefficient of the uplink signal. The transmission power of the uplink signal in each subband may be the power of the uplink signal after scaling by the power scaling coefficient of each subband. For example, the first subband determines the transmission power of the uplink signal in the first subband according to the power scaling coefficient of the first subband, and the second subband determines the transmission power of the uplink signal in the second subband according to the power scaling coefficient of the second subband. The transmission power of the uplink signal of each non-zero antenna port may be the power of the uplink signal after scaling by the power scaling coefficient of each non-zero antenna port.

It should be understood that the transmission power of the uplink signal in each subband is not necessarily to calculate the transmission power of each subband, but can also calculate the transmission power of some subbands, and the transmission power of other subbands is determined by the transmission power of some subbands. For example, a plurality of adjacent subbands are formed into a group, and one power scaling coefficient is determined for each group of subbands, the transmission power of each subband in the group is determined.

In the above embodiments of the present disclosure, the terminal obtains scheduling information of uplink signals, wherein the scheduling information at least indicates related information of Q subbands, a first power scaling coefficient is determined according to the scheduling information, and the transmission power of the uplink signal is determined based on the first power scaling coefficient, which can solve the problem that in the related art, when the frequency selective precoding is performed on the uplink signal (that is, subband precoding, the uplink signal is separately precoded in different frequency domain resources), the transmission power of the uplink signal cannot be determined. The systems to which some embodiments of the present disclosure are applicable include, but are not limited to, NR systems, LTE systems, sixth-generation (6G) systems, systems of evolved versions, and the like.

Optionally, before the step 11, the method further includes:

obtaining a transmission power control rule of the uplink signal;

The step 12 includes:

Determining the first power scaling coefficient according to the scheduling information and the transmission power control rule of the uplink signal.

Specifically, the terminal may determine the first power scaling coefficient according to the transmission power control rule of the uplink signal and according to the scheduling information. Wherein, the transmission power control rule of the uplink signal may be agreed in a protocol or obtained from the network side device, which is not specifically limited herein. The transmission power control rule of the uplink signal is a rule for determining the transmission power of the uplink signal.

Optionally, the step 12 includes:

determining at least one of a precoding matrix, the number of non-zero antenna ports, and the number Q of subbands for non-zero transmission of the uplink signal according to the scheduling information;

determining the first power scaling coefficient according to at least one of the precoding matrix, the number of non-zero antenna ports, and the number Q of subbands.

In the above embodiment, the non-zero antenna port refers to the antenna port on which the uplink signal is transmitted with non-zero power. That is, the transmission power of data on non-zero antenna ports is not zero. Optionally, the non-zero antenna port of the uplink signal corresponds to the antenna port corresponding to the non-zero element in the precoding matrix used by the uplink signal.

Optionally, the number of non-zero antenna ports is the total number of antenna ports on which the uplink signal is transmitted with non-zero power. Optionally, the number of non-zero antenna ports is the number of non-zero antenna ports of the uplink signal in each subband (for example, there are the number Q of nonzero antenna ports for Q subbands). Optionally, the number of non-zero antenna ports is the number of non-zero antenna ports of the uplink signal in some sub-bands (for example, the number of non-zero antenna ports in some sub-bands is the number of non-zero antenna ports in one sub-band.) Optionally, the number of the non-zero antenna ports is a combination of a plurality of items in the above example.

Optionally, the number Q of subbands is the total number of subbands in which the uplink signal is transmitted with non-zero power. That is, the transmission power of the data on the non-zero transmission subband is not zero. The number Q of subbands may be determined by scheduling information, or may be obtained according to subband configuration information.

Optionally, when Q is greater than 1, the precoding matrix may be a precoding matrix corresponding to each subband of the uplink signal.

Optionally, when the first power scaling coefficient includes power scaling coefficients of Q (Q>1) subbands, the power scaling coefficient of each subband is determined according to the number of non-zero antenna ports corresponding to each subband. Optionally, the power scaling coefficient of each subband is proportional to the number of non-zero antenna ports of each subband.

Optionally, when the first power scaling coefficient includes the power scaling coefficient of the uplink signal, the power scaling coefficient of the uplink signal is determined according to the number Q of subbands. Optionally, the number Q of subbands is inversely proportional to the power scaling coefficient of the uplink signal.

Optionally, in the case that the first power scaling coefficient includes the power scaling coefficients of the Q subbands, the power scaling coefficients of the Q subbands are a function of the number of non-zero antenna ports corresponding to the Q subbands; and/or, In the case that the first power scaling coefficient includes a power scaling coefficient of the uplink signal, the power scaling coefficient of the uplink signal is a function of the number of non-zero antenna ports.

Optionally, in the case that the first power scaling coefficient includes the power scaling coefficients of Q subbands, if Q is greater than 1, the power scaling coefficient of each subband is a function of the number of non-zero antenna ports corresponding to each subband, that is, the power of the uplink signal is scaled by a function of the number of non-zero antenna ports corresponding to each subband, and the scaled power is the transmission power of the uplink signal in each subband. Optionally, in the case that the first power scaling coefficient includes the power scaling coefficients of Q subbands, if Q is greater than 1, the power scaling coefficient of any subband may be a function of the number of non-zero antenna ports corresponding to one of the subbands, that is, the power scaling coefficient of each subband can be a function of the number of non-zero antenna ports corresponding to the subband, or a function of the number of non-zero antenna ports corresponding to another subband. Particularly, the power scaling coefficient of the subband may be a function of the number of the Q subbands, for example, the power scaling coefficient of the subband is inversely proportional to the number of the subbands.

Optionally, in the case that the first power scaling coefficient includes the power scaling coefficient of the uplink signal, the power scaling coefficient of the uplink signal is a function of the number of non-zero antenna ports, that is, the power of the uplink signal is scaled through a function of the number of all non-zero antenna ports in the whole bandwidth, and the scaled power is the total transmission power of the uplink signal.

Optionally, in the case that the first power scaling coefficient includes the power scaling coefficients of Q subbands, determining the first power scaling coefficient according to at least one of the precoding matrix, the number of non-zero antenna ports, and the number Q of subbands includes:

Determining the power scaling coefficients of the Q subbands according to any one of the following formulas:

$$\beta_{sub}=N/M/M_{sub} \qquad \text{Formula 1:}$$

$$\beta_{sub}=1/M_{sub} \qquad \text{Formula 2:}$$

$$\beta_{sub}=N/M \qquad \text{Formula 3:}$$

$$\beta_{sub}=N/M_{sub} \qquad \text{Formula 4:}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Specifically, in Formula 1, the power scaling coefficients of the Q subbands are determined according to M, the number of non-zero antenna ports and the number of subbands, that is, the power scaling coefficient of each subband is obtained from the number of non-zero antenna ports of each subband divided by the value of M and divided by the number of subbands. In Formula 2, the power scaling coefficients of the Q subbands are determined according to the number of subbands, that is, the value obtained by dividing 1 by the number of subbands is the power scaling coefficient of each subband. In formula 3, the power scaling coefficient of the uplink signal in each subband is determined according to M and the number of non-zero antenna ports, that is, the number of non-zero antenna ports in each subband divided by M is the power scaling coefficient of each subband. In Formula 4, the power scaling coefficients of the Q subbands are determined according to the number of non-zero antenna ports and the number of subbands, that is, the number of non-zero antenna ports of each subband divided by the number of subbands is the power scaling coefficient of each subband.

Optionally, in the case that the first power scaling coefficient includes the power scaling coefficients of the Q subbands, according to at least one of the precoding matrix, the number of non-zero antenna ports, and the number of subbands Q, after determining the first power scaling coefficient, the method further includes:

Determining the power scaling coefficient of the uplink signal according to the power scaling coefficients of the Q subbands.

At this time, the power scaling coefficients of the Q subbands are not the power scaling coefficients actually used when the uplink signal is transmitted in the Q subbands. The power scaling coefficient of the uplink signal may be the scaling coefficient used when the uplink signal is actually transmitted, for example: the power scaling coefficient of the uplink signal is one or more of the following: a coefficient for scaling the total power of the uplink signal; a coefficient for scaling the power of the uplink signal in the subband; a coefficient for scaling the power of the antenna port of the uplink signal; a coefficient for scaling the resource element (RE) of the uplink signal.

Specifically, the power scaling coefficients of the Q subbands are determined according to at least one of the precoding matrix, the number of non-zero antenna ports, and the number of subbands Q, and then the power scaling coefficient of the uplink signal is determined according to the power scaling coefficients of the Q subbands. Wherein, when Q>1, the power scaling coefficient of each subband may also be determined according to the number of non-zero antenna ports of each subband, which is not specifically limited here.

It should be understood that, the power scaling coefficients of the Q subbands are determined according to at least one of the precoding matrix, the number of non-zero antenna ports, and the number Q of subbands, and then the power scaling coefficient of the uplink signal is determined based on the power scaling coefficients of the Q subbands.

Optionally, when Q>1, the determining the power scaling coefficient of the uplink signal according to the power scaling coefficients of the Q subbands includes:

Mode 1: Determining the power scaling coefficient of the uplink signal according to the minimum power scaling coefficient among the power scaling coefficients of the Q subbands; or, Mode 2: Determining the power scaling coefficient of the uplink signal according to the power scaling coefficient of a specific subband in the Q subbands.

Specifically, when Q>1, in mode 1, the terminal calculates power scaling coefficient for each subband in all subbands of the entire bandwidth, and then uses the minimum value of the plurality of power scaling coefficients as the power scaling coefficient of the uplink signal. It can be understood that: the power scaling coefficient of the uplink signal is equal to the minimum value of the power scaling coefficients of the subbands, and the uplink signal uses the minimum value of the power scaling coefficients of the subbands in the entire bandwidth, that is, in each subband, the uplink signal uses the minimum value among the power scaling coefficients of the subbands.

In the second mode, the terminal uses the power scaling coefficient of a specific subband in the plurality of subbands as the power scaling coefficient of the uplink signal. It can be understood that: the power scaling coefficient of the uplink signal is equal to the power scaling coefficient of the specific subband, and the uplink signal uses the power scaling coefficient of the specific subband in the entire bandwidth, that is, in each subband, the uplink signal uses the power scaling coefficient of the specific subband.

Further, the specific subband includes but is not limited to any of the following:

a subband pre-agreed by the terminal and the network side device; for example: a subband with a minimum label;

a subband indicated by the network side device through a first signaling;

a subband indicated by the terminal to the network side device through a second signaling.

Optionally, in the case that the first power scaling coefficient includes the power scaling coefficient of the uplink signal, and Q>1, and the number of non-zero antenna ports is the number of non-zero antenna ports of each subband, determining the first power scaling coefficient according to at least one of the precoding matrix, the number of non-zero antenna ports, and the number Q of subbands includes:

Determining the power scaling coefficient of the uplink signal according to the minimum number of non-zero antenna ports among the numbers of non-zero antenna ports of the subbands.

Specifically, when the number of subbands is more than one, the terminal determines the power scaling coefficient of the uplink signal according to the minimum number of non-zero antenna ports among the number of non-zero antenna ports of the subbands. For example, the power scaling coefficient of the uplink signal is proportional to the minimum number of non-zero antenna ports.

For example: the number Q of subbands is 2, which are the first subband and the second subband respectively, the number of non-zero antenna ports in the first subband is 1, and the number of non-zero antenna ports in the second subband is 2, then the power scaling coefficient of the uplink signal is determined according to the number of non-zero antenna ports in the first subband.

Further, determining the power scaling coefficient of the uplink signal according to the minimum number of non-zero antenna ports in the number of non-zero antenna ports of the subbands, includes:

Determining the power scaling coefficient of the uplink signal according to the following formula:

$$\beta = N_{min}/M$$

Among them, $N_{min}$ is the minimum number of non-zero antenna ports in the number of non-zero antenna ports of the subbands;

$\beta$ is the power scaling coefficient of the uplink signal;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

For example: the number Q of subbands is 2, which are the first subband and the second subband respectively, the number of non-zero antenna ports in the first subband is 1, and the number of non-zero antenna ports in the second subband is 2, then $N_{min}$ is 1, and if M takes a value of 2, the power scaling coefficient $\beta$ of the uplink signal is ½.

Optionally, when there are more than one non-zero antenna ports, the determining the transmission power of the uplink signal according to the first power scaling coefficient includes:

determining the first non-zero antenna port according to the first power scaling coefficient and the number of resource elements (REs) corresponding to the non-zero transmission of the uplink signal corresponding to the non-zero antenna ports;

determining the transmission power of the first non-zero antenna port on one non-zero transmitted RE according to the first power scaling coefficient.

Optionally, the first non-zero antenna port is a non-zero antenna port with the maximum number of non-zero transmitted REs among the numbers of the non-zero transmitted REs corresponding to the non-zero antenna ports.

Optionally, the transmission power of the uplink signal includes the transmission power of the first non-zero antenna port on one non-zero transmitted RE; the terminal needs to determine the number of non-zero transmitted REs corresponding to each non-zero antenna port, the transmission power of the first non-zero antenna port with the maximum number of non-zero transmitted REs on one RE is determined according to the first power scaling coefficient.

It should be understood that each non-zero antenna port corresponds to a plurality of REs, including REs transmitted with zero power by the uplink signal and REs transmitted with non-zero power by the uplink signal. The number of REs transmitted with non-zero power is the number of REs transmitted with non-zero power by the uplink signal corresponding to each non-zero antenna port. Optionally, the RE corresponding to each antenna port may be understood as the time-frequency resource or frequency resource or time domain resource corresponding to the antenna port. Optionally, the above-mentioned number of REs refers to the number of REs in one time domain unit. The time domain unit may be a symbol or a time slot (slot) or the like.

Optionally, after determining the transmission power of the first non-zero antenna port on a non-zero transmitted RE, the determining the transmission power of the uplink signal further includes:

Case 1: According to the transmission power of the first non-zero antenna port on a non-zero transmitted RE, determining the transmission power of the first non-zero antenna port on all non-zero transmitted REs of the first non-zero antenna port; or, Case 2: According to the transmission power of the first non-zero antenna port on a non-zero transmitted RE, determining the transmission power of other non-zero antenna ports on each non-zero transmitted RE of the other non-zero antenna ports;

Wherein, the other non-zero antenna ports are the non-zero antenna ports of the uplink signal other than the non-zero antenna ports with the maximum number of REs. In case 1, the transmission power of the uplink signal includes the transmission power of the first non-zero antenna port on all non-zero transmitted REs of the first non-zero antenna port; according to the transmission power of the first non-zero antenna port on one non-zero transmitted RE, the transmission power can be taken as the transmission power of the first non-zero antenna port on each non-zero transmitted RE of the port, in other words, the transmission power of first non-zero antenna port on all non-zero transmitted REs of the first non-zero antenna port is equal. Optionally, the transmission power of the first non-zero antenna port on all non-zero transmitted REs of the port may be further determined, that is, the total transmission power of the first non-zero antenna port is equal to the sum of the transmission power of the first non-zero antenna port on each non-zero transmitted RE of the port.

For example: the uplink signal is a PUSCH signal. If the entire bandwidth of the PUSCH has only non-zero antenna port 0 and non-zero antenna port 1, the number of non-zero transmitted REs of the non-zero antenna port 0 is greater than the number of non-zero transmitted REs of the non-zero antenna port 1, the first non-zero antenna port is the non-zero antenna port 0; if the transmission power of non-zero antenna port 0 on one non-zero transmitted RE is P1, then the transmission power of the non-zero antenna port 0 on any non-zero transmitted RE is P1.

In case 2, the transmission power of the uplink signal includes the transmission power of the other non-zero antenna ports on each non-zero transmitted RE of the other non-zero antenna ports; according to the transmission power of the first non-zero antenna port on one non-zero transmitted RE, the transmission power can be taken as the transmission power of the other non-zero antenna ports on each non-zero transmitted RE of the other non-zero antenna ports, in other words, the transmission power of the other non-zero antenna ports on their respective non-zero transmitted REs are all equal and equal to the transmission power of the first non-zero antenna port on the non-zero transmitted RE of the first non-zero antenna port.

Optionally, the number of the other non-zero antenna ports may be one or more, and when the number of the other non-zero antenna ports is more than one, transmission power of each of the other non-zero antenna ports on the non-zero transmitted RE thereof is the same.

For example: the uplink signal is a PUSCH signal. If the entire bandwidth of the PUSCH has only non-zero antenna port 0 and non-zero antenna port 1, the number of non-zero transmitted REs of non-zero antenna port 0 is greater than the number of non-zero transmitted REs of non-zero antenna port 1, the first non-zero antenna port is non-zero antenna port 0; if the transmission power of non-zero antenna port 0 on one non-zero transmitted RE is P1, then the transmission power of the non-zero antenna port 1 on any non-zero transmitted RE is P1.

Optionally, after determining the transmission power of the first non-zero antenna port on all non-zero transmitted REs of the first non-zero antenna port, the determining the transmission power of the uplink signal further includes:

According to the transmission power of the first non-zero antenna port on all non-zero transmitted REs of the first non-zero antenna port, determining the transmission power of other non-zero antenna ports on all non-zero transmitted REs of the other non-zero antenna ports included in the transmission power of the uplink signal.

Specifically, the transmission power of the uplink signal includes transmission power of other non-zero antenna ports on all non-zero transmitted REs of the other non-zero antenna ports; according to the transmission power of the first non-zero antenna ports on all non-zero transmitted REs of the first non-zero antenna port, the transmission power is taken as the transmission power of other non-zero antenna ports on all non-zero transmitted REs thereof. Optionally, the total transmission power of the uplink signal is equal to the sum of transmission power of each non-zero antenna port on all non-zero transmitted REs.

Optionally, in the case that there are more than one non-zero antenna ports, the step 13 includes:

determining, according to the first power scaling coefficient, the transmission power of each non-zero antenna port on each non-zero transmitted RE of the each non-zero antenna port;

determining, according to the minimum transmission power among the transmission power of each non-zero antenna port corresponding to each sub-band in the Q sub-bands on each non-zero transmitted RE, the transmission power of each non-zero antenna port corresponding to the Q sub-bands on each non-zero transmitted RE.

Specifically, the transmission power of the uplink signal includes the transmission power of each non-zero antenna port corresponding to the Q subbands on each non-zero transmitted RE thereof; the terminal determines the transmission power of each non-zero antenna port on each non-zero transmitted RE. In each subband, the minimum one of the transmission powers of the non-zero antenna ports of the sub-band on non-zero transmitted REs thereof is used as the transmission power of the non-zero antenna ports of the sub-band on each non-zero transmitted RE thereof, it is further determined that the total transmission power of one non-zero antenna port is equal to the sum of the transmission power of the non-zero antenna port on all non-zero transmitted REs, it is further determined that the total transmission power of the uplink signal is equal to the sum of the total transmission power of each non-zero antenna port.

For example: the uplink signal is PUSCH as an example, assuming that the transmission power of non-zero antenna port 0 per RE is p1, the transmission power of non-zero antenna port 1 per RE is p2, p1<p2, assuming that the non-zero antenna ports of the PUSCH in subband 1 are non-zero antenna port 0 and non-zero antenna port 1, then the transmission power of each of non-zero antenna port 0 and non-zero antenna port 1 on RE with PUSCH non-zero transmission in subband 1 is p1. Assuming that the antenna port for PUSCH non-zero transmission in subband 2 is non-zero antenna port 1, the transmission power of non-zero antenna port 1 in subband 2 on each RE with PUSCH non-zero transmission is p2.

Optionally, in the case that the first power scaling coefficient includes the power scaling coefficients of the Q subbands, and Q>1, the step 13 includes:

According to the power scaling coefficients of the uplink signal in the Q subbands, determining the transmission power of the uplink signal in each subband included in the transmission power of the uplink signal.

Specifically, the transmission power of the uplink signal includes the transmission power of the uplink signal in each subband; when Q is 1, the transmission power of the uplink signal in this subband is determined according to the power scaling coefficient of the uplink signal in one subband. When Q>1, the transmission power of the uplink signal in the subband is determined according to the power scaling coefficient of the uplink signal in each subband. Wherein, the total transmission power of the uplink signal is equal to the sum of the transmission power of each subband in the subband.

For example: the transmission power of the uplink signal in each subband is determined according to the product of the power scaling coefficient of each subband and the first power; it can be understood as: the value obtained by multiplying the power scaling coefficient of each subband and the first power is the transmission power of the uplink signal in this subband.

Optionally, in the case that the transmission power of the uplink signal includes the total transmission power of the uplink signal, the step 13 further includes any one of the following:

The first item: determining the transmission power of the uplink signal in each subband according to the total transmission power of the uplink signal and the number Q of subbands, Q>1;

The second item: determining the transmission power of the uplink signal of each non-zero antenna port according to the total transmission power of the uplink signal and the number of the non-zero antenna ports, wherein there are more than one non-zero antenna ports.

Optionally, in the first item, when Q>1, the transmission power of the uplink signal includes the transmission power of the uplink signal in each subband, and the transmission power of the uplink signal in each subband is determined according to the total transmission power of the uplink signal and the number of subbands for non-zero transmission in the whole bandwidth. The sum of the transmission power of the uplink signal in each subband is equal to the total transmission power of the uplink signal.

Optionally, in the second item, when there are more than one non-zero antenna ports, the transmission power of the uplink signal includes the transmission power of the uplink signal of each non-zero antenna port; the transmission power of the uplink signal of each non-zero antenna port is determined according to the total transmission power of the uplink signal and the number of antenna ports for all non-zero transmissions in the whole bandwidth. The sum of the transmission power of the uplink signal of each non-zero antenna port is equal to the total transmission power of the uplink signal.

Optionally, in the first item, determining the transmission power of the uplink signal in each subband according to the total transmission power of the uplink signal and the number Q of subbands, includes:

dividing evenly the transmission power of the uplink signal divided into each subband according to the total transmission power of the uplink signal and the number Q of the subbands.

It can be understood that the total transmission power of the uplink signal divided by the number Q of subbands is the transmission power of the uplink signal in each subband, that is, the transmission power of each subband is the same. If the number of non-zero antenna ports in a subband is different, the transmission power of each antenna port in each subband may be different.

The above-mentioned related content is described in detail below through specific embodiments:

For example: assuming PUSCH contains 2 subbands (the number Q of subbands is 2), the precoding matrix of the first subband is $$\frac{1}{\sqrt{2}}\begin{bmatrix}1\\0\end{bmatrix},$$

and the precoding matrix of the second subband is $$\frac{1}{\sqrt{2}}\begin{bmatrix}1\\1\end{bmatrix},$$

then the number of non-zero antenna ports of PUSCH in the first subband is 1 (the first antenna port is a non-zero antenna port), and the number of non-zero antenna ports in the second subband is 1 2 (both of the two antenna ports are non-zero antenna ports), then the UE determines the power scaling coefficient of the uplink signal according to the minimum value of the number of non-zero antenna ports 1 and 2 of the two subbands (that is, the power scaling coefficient of the uplink signal is determined according to the minimum number of non-zero antenna ports in the number of non-zero antenna ports in each subband), then $N_{min}=1$; assuming M=2, then the power scaling coefficient of the PUSCH (that is, the power scaling coefficient of the uplink signal) is obtained according to the formula $$\beta=N_{min}/M$$

$\beta=\frac{1}{2}$; since the PUSCH contains two subbands, the total transmission power of the uplink signal obtained after the first power is multiplied by the power scaling coefficient of the uplink signal is evenly distributed to the two subbands.

Optionally, in the second item, determining the transmission power of the uplink signal of each non-zero antenna port according to the total transmission power of the uplink signal and the number of non-zero antenna ports, includes any of the following:

Case 1: According to the total transmission power of the uplink signal and the number of non-zero antenna ports, the transmission power of the uplink signal is evenly divided into each non-zero antenna port;

Case 2: According to the total transmission power of the uplink signal and the proportion of the number of non-zero antenna ports corresponding to each sub-band to the number of all non-zero antenna ports corresponding to each sub-band, the transmission power of the uplink signal of each non-zero antenna port is determined;

Case 3: According to the total transmission power of the uplink signal and the proportion of a number of non-zero elements corresponding to non-zero antenna ports in the precoding matrix corresponding to each sub-band to a number of all non-zero elements in the precoding matrix, the transmission power of the uplink signal of each non-zero antenna port is determined.

It can be understood that in case 1, the total transmission power of the uplink signal is divided by the number of non-zero antenna ports to obtain the transmission power of each non-zero antenna port, that is, the transmission power of each non-zero antenna port is the same. At this time, if the number of non-zero antenna ports in each subband is different, the transmission power of each subband is the sum of the transmission powers of all non-zero antenna ports in the subband, and the transmission power of each subband is different.

The content related to case 1 is described in detail below through specific embodiments:

For example: assuming PUSCH contains 2 subbands (the number Q of subbands is 2), the precoding matrix of the first subband is $$\frac{1}{\sqrt{2}}\begin{bmatrix}1\\0\end{bmatrix},$$

and the precoding matrix of the second subband is $$\frac{1}{\sqrt{2}}\begin{bmatrix}1\\1\end{bmatrix},$$

then the number of non-zero antenna ports of PUSCH in the first subband is 1 (the first antenna port is a non-zero antenna port), and the number of non-zero antenna ports in the second subband is 2 (both of the two antenna ports are non-zero antenna ports), then the UE determines the power scaling coefficient of the uplink signal according to the minimum value of the number of non-zero antenna ports 1 and 2 of the two subbands (that is, the power scaling coefficient of the uplink signal is determined according to the minimum number of non-zero antenna ports in the number of non-zero antenna ports), then $N_{min}$=1; assuming M=2, then the scaling coefficient of PUSCH (that is, the power scaling coefficient of the uplink signal) is obtained according to the formula $$\beta=N_{min}/M$$

$\beta$=½; since the number of non-zero ports of PUSCH in all subbands is 2, the total transmission power of the uplink signal obtained after the first power is multiplied by the power scaling coefficient of the uplink signal is evenly distributed to 2 non-zero ports.

For example: assuming PUSCH contains 2 subbands (the number Q of subbands is 2), the precoding matrix of the first subband is $$\frac{1}{\sqrt{2}}\begin{bmatrix}1\\0\end{bmatrix},$$

and the precoding matrix of the second subband is $$\frac{1}{\sqrt{2}}\begin{bmatrix}1\\1\end{bmatrix},$$

then the number of non-zero antenna ports of PUSCH in the first subband is 1 (the first antenna port is a non-zero antenna port), and the number of non-zero antenna ports in the second subband is 2 (both antenna ports are non-zero antenna ports), then according to formula 3

$$\frac{1}{\sqrt{2}}\begin{bmatrix}1\\1\end{bmatrix}$$

N=1 for the first subband, N=2 for the second subband, assuming M=2, the power scaling coefficient of the first subband is ½, and the power scaling coefficient of the second subband is 1, then the power scaling coefficient of the uplink signal is ½ which is the smaller one between the power scaling coefficient of the first subband and the power scaling coefficient of the second subband; the total transmission power of the uplink signal obtained by multiplying the first power by ½ is evenly distributed to the two non-zero ports.

The content related to case 2 is described in detail below through specific embodiments:

In case 2, if the PUSCH contains 2 sub-bands (sub-band 1 and sub-band 2), the number of non-zero antenna ports for sub-band 1 is 4, which are one non-zero antenna port 0 and three non-zero antenna ports 1 respectively, then the proportion of non-zero antenna port 0 in subband 1 is ¼, and the proportion of non-zero antenna port 1 in subband 1 is ¾, then the terminal determines the transmission power of the non-zero antenna port 0 in subband 1 according to the total transmission power of the uplink signal and the proportion ¼ of non-zero antenna port 0; the terminal determines the transmission power of each non-zero antenna port 1 in the subband 1 according to the total transmission power of the uplink signal and the proportion ¾ of the non-zero antenna port 1; the method is also applied for subband 2 to determine the transmission power of each non-zero antenna port in the subband 2.

The content related to case 3 is described in detail below through specific embodiments:

In case 3, if the PUSCH contains 2 subbands (subband 1 and subband 2), the number of non-zero antenna ports in the precoding matrix corresponding to subband 1 is 4, and the non-zero elements corresponding to the 4 non-zero antenna ports are 1, 0, 0, and 1 respectively, then the proportion of non-zero elements 0 contained in the precoding matrix corresponding to subband 1 is ½, and the proportion of non-zero elements 1 is ½, then the transmission power of the non-zero antenna port whose non-zero element is 0 according to the total transmission power and the proportion ½ of the non-zero element 0; the transmission power of a non-zero antenna port whose non-zero element is 1 is determined according to the total transmission power of the uplink signal and the proportion ½ of the non-zero element 1. The method is also applied for subband 2 to determine the transmission power of each non-zero antenna port in the subband 2.

It should be noted that determining the transmission power of the uplink signal of each non-zero antenna port is not limited to the above three cases.

Optionally, in the case that the transmission power of the uplink signal includes the transmission power of the uplink signal in Q subbands, and there are more than one non-zero antenna ports, the step 13 further includes:

Determining the transmission power of uplink signal at non-zero antenna ports corresponding to the Q subbands included in the transmission power of the uplink signal according to the transmission power of the uplink signal in the Q subbands and the number of non-zero antenna ports corresponding to the Q subbands.

Specifically, the transmission power of the uplink signal includes the transmission power of the uplink signal of the non-zero antenna ports corresponding to the Q subbands; when Q is 1, the transmission power of the uplink signal of each non-zero antenna port of the subband is determined according to the transmission power of the uplink signal in one subband. When Q is greater than 1, the transmission power of the uplink signal of each non-zero antenna port of the subband is determined according to the transmission power of the uplink signal in each subband.

Optionally, determining the transmission power of uplink signal at non-zero antenna ports corresponding to the Q subbands according to the transmission power of the uplink signal in the Q subbands and the number of non-zero antenna ports corresponding to the Q subbands, includes any of the following:

Case 1: according to the transmission power of the uplink signal in the Q subbands and the number of non-zero antenna ports corresponding to the Q subbands, the transmission power of the uplink signal is evenly divided into the non-zero antenna ports;

Case 2: according to the transmission power of the uplink signal in the Q sub-bands and the proportion of the number of each non-zero antenna port corresponding to the Q sub-bands to the number of all non-zero antenna ports corresponding to the Q sub-bands, determining the transmission power of the uplink signal on each non-zero antenna port corresponding to each subband, Q>1;

Case 3: according to the transmission power of the uplink signal in the Q subbands and the proportion of a number of non-zero elements corresponding to each non-zero antenna port included in the precoding matrix corresponding to the Q subbands to a number of all non-zero elements in the precoding matrix, determining the transmission power of the uplink signal on each non-zero antenna port corresponding to the Q sub-bands.

In case 1, when Q is 1, the transmission power of the uplink signal in one subband is divided by the number of non-zero antenna ports in the subband to obtain the transmission power of each non-zero antenna port in the subband, that is, the transmission power of each non-zero antenna port of the subband is the same. When Q>1, the transmission power of the uplink signal in each sub-band is divided by the number of non-zero antenna ports in the sub-band to obtain the transmission power of each non-zero antenna port in the sub-band, that is, the transmission power of each non-zero antenna port in the subband is the same.

In case 2, when Q is 1, the number of non-zero antenna ports in the subband is 4, which are one non-zero antenna port 0 and three non-zero antenna ports 1 respectively, then the proportion of the non-zero antenna ports 0 in this subband is ¼, and the proportion of non-zero antenna port 1 is ¾, then the terminal determine the transmission power of the non-zero antenna port 0 of the subband according to the transmission power of the uplink signal in this subband and the proportion ¼ of non-zero antenna port 0; the terminal determine the transmission power of the non-zero antenna port 1 of the subband according to the transmission power of the uplink signal in this subband and the proportion ¾ of non-zero antenna port 1. When Q>1, the method for determining the transmission power of each non-zero antenna port of each subband is similar to the above method, and details are not described here.

In case 3, when Q is 1, the number of non-zero antenna ports in this subband is 4, and the non-zero elements in the 4 non-zero antenna ports are 1, 0, 0, and 1 respectively, then the proportion of the non-zero element 0 contained in the precoding matrix corresponding to the subband is ½, and the proportion of the non-zero element 1 is ½, then the transmission power of the non-zero antenna port whose non-zero element is 0 is determined according to the transmission power of the uplink signal in this subband and the proportion ½ of non-zero element 0; the transmission power of the non-zero antenna port whose non-zero element is 1 is determined according to the transmission power of the uplink signal in this subband and the proportion ½ of non-zero element 1; Subband 2 determines the transmission power of each non-zero antenna port in subband 2 according to the above method. When Q>1, the method for determining the transmission power of each non-zero antenna port of each subband is similar to the above method, and details are not described here.

For example, the transmission power of the uplink signal in the Q subbands is the transmission power of the uplink signal in each subband. The transmission power of the uplink signal in each subband may be determined according to the power scaling coefficient of the signal in each sub-band, and the power scaling coefficient of each subband may be determined according to the number of non-zero antenna ports in each subband.

It should be noted that, in any of the above embodiments, the power scaling coefficients of the uplink signal in the Q subbands may specifically be the power scaling coefficients of the uplink signal in each subband.

Figure 2:
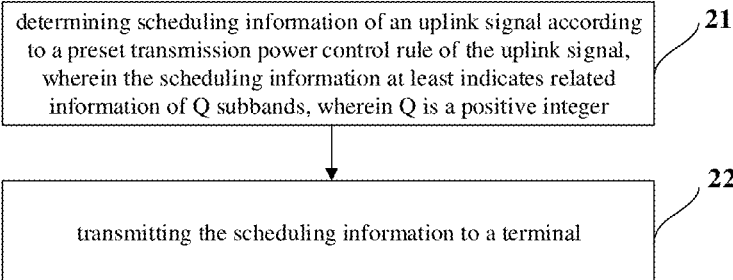
FIG. 2 shows a flowchart of a method for determining scheduling information according to some embodiments of the present disclosure.

As shown in FIG. 2, an embodiment of the present disclosure also provides a method for determining scheduling information, which is applied to a network side device, and specifically includes the following steps:

Step 21: Determining scheduling information of an uplink signal according to a preset transmission power control rule of the uplink signal, wherein the scheduling information at least indicates related information of Q subbands, where Q is a positive integer.

Specifically, the scheduling information is information indicating how the uplink signal should be transmitted, and the scheduling information may include but is not limited to at least one of the following information: precoding matrix indication information, transport stream number indication information, uplink signal resource allocation information or SRS resource indication information, etc.

It should be noted that the related information of the Q subbands may be a precoding matrix corresponding to the subband, or may also be the number of transport streams corresponding to the subband, or may be SRS resource indication information corresponding to the subband, or may also be a combination of a precoding matrix, the number of transport streams, and SRS resource indication information. Wherein, Q is a positive integer greater than or equal to 1.

It should be noted that the uplink signal includes but is not limited to at least one of the following: a PUSCH signal, a DMRS, a PUCCH signal, a PRACH signal, an SRS, and the like.

Step 22, transmitting the scheduling information to a terminal;

The transmission power control rule of the uplink signal includes:

Determining, by the terminal, a first power scaling coefficient according to the scheduling information;

Determining, by the terminal, the transmission power of the uplink signal according to the first power scaling coefficient.

Specifically, the network side device transmits the scheduling information to the terminal, so that the terminal determines the first power scaling coefficient according to the scheduling information, and the terminal determines the transmission power of the uplink signal according to the first power scaling coefficient, so as to solve the problem in the related art that when the uplink signal is subjected to frequency selective precoding, the transmission power of the uplink signal cannot be determined.

In the above-mentioned embodiments of the present disclosure, scheduling information of the uplink signal is determined according to the preset transmission power control rule of the uplink signal, the scheduling information at least indicates the related information of Q subbands, Q is a positive integer, and the scheduling information is sent to the terminal, so that the terminal determines the first power scaling coefficient according to the scheduling information, and the terminal determines the transmission power of the uplink signal according to the first power scaling coefficient, so as to solve the problem in the related art that when the uplink signal is subject to frequency selective precoding, it is impossible to determine the transmission power of the uplink signal.

Optionally, before transmitting the scheduling information to the terminal, the method further includes:

transmitting the transmission power control rule of the uplink signal to the terminal;

The determining, by the terminal, the first power scaling coefficient according to the scheduling information, includes:

Determining, by the terminal, the first power scaling coefficient according to the scheduling information and the transmission power control rule of the uplink signal.

Optionally, the determining, by the terminal, the first power scaling coefficient according to the scheduling information, includes:

Determining, by the terminal, at least one of a precoding matrix, a number of non-zero antenna ports, and a number Q of subbands for non-zero transmission of the uplink signal according to the scheduling information;

Determining, by the terminal, the first power scaling coefficient according to at least one of the precoding matrix, the number of non-zero antenna ports, and the number Q of subbands.

Optionally, the first power scaling coefficient includes at least one of the power scaling coefficients of the Q subbands and the power scaling coefficient of the uplink signal.

Optionally, in the case that the first power scaling coefficient includes the power scaling coefficients of Q subbands, determining the first power scaling coefficient according to at least one of the precoding matrix, the number of non-zero antenna ports, and the number Q of subbands includes:

Determining the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes the power scaling coefficients of the Q subbands, according to at least one of the precoding matrix, the number of non-zero antenna ports, and the number of subbands Q, after determining the first power scaling coefficient, the transmission power control rule for the uplink signal further includes:

Determining, by the terminal, the power scaling coefficient of the uplink signal according to the power scaling coefficients of the Q subbands.

Optionally, when Q>1, the determining, by the terminal, the power scaling coefficient of the uplink signal according to the power scaling coefficients of the Q subbands includes:

Determining, by the terminal, the power scaling coefficient of the uplink signal according to the minimum power scaling coefficient among the power scaling coefficients of the Q subbands; or, Determining, by the terminal, the power scaling coefficient of the uplink signal according to the power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, determining the first power scaling coefficient according to at least one of the precoding matrix, the number of non-zero antenna ports, and the number Q of subbands includes:

Determining, by the terminal, the power scaling coefficient of the uplink signal according to the minimum number of non-zero antenna ports among the numbers of non-zero antenna ports of the subbands.

Optionally, when there are more than one non-zero antenna ports, the determining, by the terminal, the transmission power of the uplink signal according to the first power scaling coefficient includes:

Determining, by the terminal, the first non-zero antenna port according to the first power scaling coefficient and the number of resource elements (Res) corresponding to the non-zero transmission of the uplink signal corresponding to the non-zero antenna ports;

Determining, by the terminal, the transmission power of the first non-zero antenna port on one non-zero transmitted RE according to the first power scaling coefficient.

Optionally, after determining the transmission power of the first non-zero antenna port on a non-zero transmitted RE, the determining, by the terminal, the transmission power of the uplink signal further includes:

determining, by the terminal, the transmission power of the first non-zero antenna port on all non-zero transmitted REs of the first non-zero antenna port according to the transmission power of the first non-zero antenna port on a non-zero transmitted RE; or, determining, by the terminal, the transmission power of other non-zero antenna ports on each non-zero transmitted RE of the other non-zero antenna ports according to the transmission power of the first non-zero antenna port on a non-zero transmitted RE;

Wherein, the other non-zero antenna ports are the non-zero antenna ports of the uplink signal other than the non-zero antenna ports with the maximum number of REs.

Optionally, in the case that there are more than one non-zero antenna ports, the determining, by the terminal, the transmission power of the uplink signal according to the first power scaling coefficient, includes:

determining, by the terminal, the transmission power of each non-zero antenna port on each non-zero transmitted RE of the each non-zero antenna port according to the first power scaling coefficient;

determining, by the terminal, the transmission power of each non-zero antenna port corresponding to the Q sub-bands on each non-zero transmitted RE according to the minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the determining, by the terminal, the transmission power of the uplink signal includes any one of the following:

Determining, by the terminal, the transmission power of the uplink signal in each subband according to the total transmission power of the uplink signal and the number Q of subbands, Q>1;

Determining, by the terminal, the transmission power of the uplink signal of each non-zero antenna port according to the total transmission power of the uplink signal and the number of the non-zero antenna ports, wherein there are more than one non-zero antenna ports.

Optionally, the determining, by the terminal, the transmission power of the uplink signal in each subband according to the total transmission power of the uplink signal and the number Q of subbands, includes:

Dividing, by the terminal, evenly the transmission power of the uplink signal divided into each subband according to the total transmission power of the uplink signal and the number Q of the subbands.

Optionally, the determining, by the terminal, the transmission power of the uplink signal of each non-zero antenna port according to the total transmission power of the uplink signal and the number of non-zero antenna ports, includes any of the following:

Dividing, by the terminal, evenly the transmission power of the uplink signal into each non-zero antenna port according to the total transmission power of the uplink signal and the number of non-zero antenna ports;

Determining, by the terminal, the transmission power of the uplink signal of each non-zero antenna port according to the total transmission power of the uplink signal and the proportion of the number of non-zero antenna ports corresponding to each sub-band to the number of all non-zero antenna ports corresponding to each subband;

Determining, by the terminal, the transmission power of the uplink signal of each non-zero antenna port according to the total transmission power of the uplink signal and the proportion of a number of non-zero elements corresponding to non-zero antenna ports in the precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the determining, by the terminal, the transmission power of the uplink signal includes any of the following:

Dividing, by the terminal, evenly the transmission power of the uplink signal into the non-zero antenna ports according to the transmission power of the uplink signal in the Q subbands and the number of non-zero antenna ports corresponding to the Q subbands;

Determining, by the terminal, the transmission power of the uplink signal on each non-zero antenna port corresponding to each subband according to the transmission power of the uplink signal in the Q sub-bands and the proportion of the number of each non-zero antenna port corresponding to the Q sub-bands to the number of all non-zero antenna ports corresponding to the Q sub-bands, Q>1;

Determining, by the terminal, the transmission power of the uplink signal on each non-zero antenna port corresponding to the Q subbands according to the transmission power of the uplink signal in the Q subbands and the proportion of a number of non-zero elements corresponding to each non-zero antenna port included in the precoding matrix corresponding to the Q subbands to a number of all non-zero elements in the precoding matrix.

It should be noted that, in the embodiment of the method for determining scheduling information applied to the network side device, the embodiment executed by the terminal in the transmission power control rule of the uplink signal is the same as the embodiment executed by the terminal in the above-mentioned method for determining the uplink power applied to the terminal. All implementations of the above-mentioned embodiment are applicable to the embodiment of the method for determining scheduling information applied to the network side device, and can achieve the same technical effect, which is not repeated here.

Figure 3:
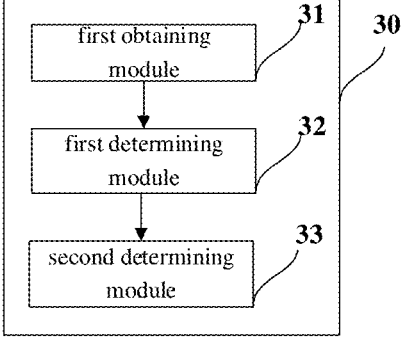
FIG. 3 is a schematic structural diagram of a terminal according to some embodiments of the present disclosure.

As shown in FIG. 3, an embodiment of the present disclosure further provides a terminal 30, including:

a first obtaining module 31, configured to obtain scheduling information of an uplink signal, wherein the scheduling information at least indicates related information of Q subbands, Q is a positive integer;

a first determining module 32, configured to determine a first power scaling coefficient according to the scheduling information;

a second determining module 33, configured to determine transmission power of the uplink signal according to the first power scaling coefficient.

Optionally, the terminal 30 further includes:

a second obtaining module, configured to obtain a transmission power control rule of the uplink signal;

The first determining module 32 is configured to determine the first power scaling coefficient according to the scheduling information and the transmission power control rule of the uplink signal.

Optionally, the first determining module 32 includes:

a first determining unit, configured to determine at least one of a precoding matrix, the number of non-zero antenna ports, and the number Q of subbands for non-zero transmission of the uplink signal according to the scheduling information;

a second determining unit, configured to determine the first power scaling coefficient according to at least one of the precoding matrix, the number of non-zero antenna ports, and the number Q of subbands.

Optionally, the first power scaling coefficient includes at least one of the power scaling coefficients of the Q subbands and the power scaling coefficients of the uplink signal.

Optionally, in the case that the first power scaling coefficient includes the power scaling coefficients of the Q subbands, the second determining unit is configured to:

determine the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes the power scaling coefficients of the Q subbands, the second determining unit further includes:

A first processing module, configured to determine the power scaling coefficient of the uplink signal according to the power scaling coefficients of the Q subbands.

Optionally, when Q>1, the first processing module includes:

a first processing unit, configured to determine the power scaling coefficient of the uplink signal according to the minimum power scaling coefficient among the power scaling coefficients of the Q subbands; or, a second processing unit, configured to determine the power scaling coefficient of the uplink signal according to the power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, the second determining unit includes:

a first determining subunit, configured to determine the power scaling coefficient of the uplink signal according to the minimum number of non-zero antenna ports among the numbers of non-zero antenna ports of the subbands.

Optionally, when there are more than one non-zero antenna ports, the second determining module further includes:

a third determining unit, configured to determine the first non-zero antenna port according to the first power scaling coefficient and the number of resource elements (REs) corresponding to the non-zero transmission of the uplink signal corresponding to the non-zero antenna ports;

a fourth determination unit, configured to determine the transmission power of the first non-zero antenna port on one non-zero transmitted RE according to the first power scaling coefficient.

Optionally, the second determining module 33 further includes:

a fifth determining unit, configured to determine the transmission power of the first non-zero antenna port on all non-zero transmitted REs of the first non-zero antenna port according to the transmission power of the first non-zero antenna port on a non-zero transmitted RE; or, a sixth determining unit, configured to determine the transmission power of other non-zero antenna ports on each non-zero transmitted RE of the other non-zero antenna ports according to the transmission power of the first non-zero antenna port on a non-zero transmitted RE;

Wherein, the other non-zero antenna ports are the non-zero antenna ports of the uplink signal other than the non-zero antenna ports with the maximum number of REs.

Optionally, when there are more than one non-zero antenna ports, the second determining module 33 includes:

a seventh determining unit, configured to determine the transmission power of each non-zero antenna port on each non-zero transmitted RE of the each non-zero antenna port according to the first power scaling coefficient;

An eighth determining unit, configured to determine the transmission power of each non-zero antenna port corresponding to the Q sub-bands on each non-zero transmitted RE according to the minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the second determining module 33 further includes any one of the following:

A ninth determining unit, configured to determine the transmission power of the uplink signal in each subband according to the total transmission power of the uplink signal and the number Q of subbands, Q>1;

A tenth determining unit, configured to determine the transmission power of the uplink signal of each non-zero antenna port according to the total transmission power of the uplink signal and the number of the non-zero antenna ports, wherein there are more than one non-zero antenna ports.

Optionally, the ninth determining unit includes:

a second determining subunit, configured to divide evenly the transmission power of the uplink signal divided into each subband according to the total transmission power of the uplink signal and the number Q of the subbands;

The tenth determining unit includes any one of the following:

a third determining subunit, configured to divide evenly the transmission power of the uplink signal into each non-zero antenna port according to the total transmission power of the uplink signal and the number of non-zero antenna ports;

a fourth determining subunit, configured to determine the transmission power of the uplink signal of each non-zero antenna port according to the total transmission power of the uplink signal and the proportion of the number of non-zero antenna ports corresponding to each sub-band to the number of all non-zero antenna ports corresponding to each sub-band;

a fifth determining subunit, configured to determine the transmission power of the uplink signal of each non-zero antenna port according to the total transmission power of the uplink signal and the proportion of a number of non-zero elements corresponding to non-zero antenna ports in the precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the second determining module 33 further includes any one of the following:

An eleventh determining unit, configured to divide evenly the transmission power of the uplink signal into the non-zero antenna ports according to the transmission power of the uplink signal in the Q subbands and the number of non-zero antenna ports corresponding to the Q subbands;

A twelfth determining unit, configured to determine the transmission power of the uplink signal on each non-zero antenna port corresponding to each subband according to the transmission power of the uplink signal in the Q sub-bands and the proportion of the number of each non-zero antenna port corresponding to the Q sub-bands to the number of all non-zero antenna ports corresponding to the Q sub-bands, Q>1;

a thirteenth determining unit, configured to determine the transmission power of the uplink signal on each non-zero antenna port corresponding to the Q subbands according to the transmission power of the uplink signal in the Q subbands and the proportion of a number of non-zero elements corresponding to each non-zero antenna port included in the precoding matrix corresponding to the Q subbands to a number of all non-zero elements in the precoding matrix.

It should be noted that the terminal embodiment is a terminal corresponding to the above-mentioned method for determining uplink power applied to the terminal, and all the implementation are applicable to the terminal embodiment, and can also achieve the same technical effect, which is not repeated here.

Figure 4:
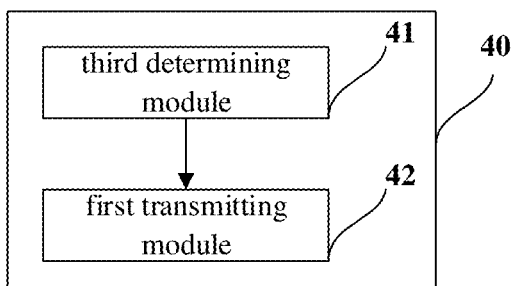
FIG. 4 is a schematic structural diagram of a network side device according to some embodiments of the present disclosure.

As shown in FIG. 4, an embodiment of the present disclosure further provides a network side device 40, including:

A third determining module 41, configured to determine scheduling information of an uplink signal according to a preset transmission power control rule of the uplink signal, wherein the scheduling information at least indicates related information of Q subbands, where Q is a positive integer;

a first transmitting module 42, configured to transmit the scheduling information to a terminal;

The transmission power control rule of the uplink signal includes:

Determining, by the terminal, a first power scaling coefficient according to the scheduling information;

Determining, by the terminal, the transmission power of the uplink signal according to the first power scaling coefficient.

Optionally, the network side device also include:

a second sending module, configured to transmit the transmission power control rule of the uplink signal to the terminal;

The determining, by the terminal, the first power scaling coefficient according to the scheduling information, includes:

Determining, by the terminal, the first power scaling coefficient according to the scheduling information and the transmission power control rule of the uplink signal.

Optionally, the determining, by the terminal, the first power scaling coefficient according to the scheduling information, includes:

Determining, by the terminal, at least one of a precoding matrix, a number of non-zero antenna ports, and a number Q of subbands for non-zero transmission of the uplink signal according to the scheduling information;

Determining, by the terminal, the first power scaling coefficient according to at least one of the precoding matrix, the number of non-zero antenna ports, and the number Q of subbands.

Optionally, the first power scaling coefficient includes at least one of the power scaling coefficients of the Q subbands and the power scaling coefficient of the uplink signal.

Optionally, in the case that the first power scaling coefficient includes the power scaling coefficients of Q subbands, determining the first power scaling coefficient according to at least one of the precoding matrix, the number of non-zero antenna ports, and the number Q of subbands includes:

Determining the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes the power scaling coefficients of the Q subbands, according to at least one of the precoding matrix, the number of non-zero antenna ports, and the number of subbands Q, after determining the first power scaling coefficient, the transmission power control rule for the uplink signal further includes:

Determining, by the terminal, the power scaling coefficient of the uplink signal according to the power scaling coefficients of the Q subbands.

Optionally, when Q>1, the determining, by the terminal, the power scaling coefficient of the uplink signal according to the power scaling coefficients of the Q subbands includes:

Determining, by the terminal, the power scaling coefficient of the uplink signal according to the minimum power scaling coefficient among the power scaling coefficients of the Q subbands; or, Determining, by the terminal, the power scaling coefficient of the uplink signal according to the power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, determining the first power scaling coefficient according to at least one of the precoding matrix, the number of non-zero antenna ports, and the number Q of subbands includes:

Determining, by the terminal, the power scaling coefficient of the uplink signal according to the minimum number of non-zero antenna ports among the numbers of non-zero antenna ports of the subbands.

Optionally, when there are more than one non-zero antenna ports, the determining, by the terminal, the transmission power of the uplink signal according to the first power scaling coefficient includes:

Determining, by the terminal, the first non-zero antenna port according to the first power scaling coefficient and the number of resource elements (Res) corresponding to the non-zero transmission of the uplink signal corresponding to the non-zero antenna ports;

Determining, by the terminal, the transmission power of the first non-zero antenna port on one non-zero transmitted RE according to the first power scaling coefficient.

Optionally, after determining the transmission power of the first non-zero antenna port on a non-zero transmitted RE, the determining, by the terminal, the transmission power of the uplink signal further includes:

determining, by the terminal, the transmission power of the first non-zero antenna port on all non-zero transmitted REs of the first non-zero antenna port according to the transmission power of the first non-zero antenna port on a non-zero transmitted RE; or, determining, by the terminal, the transmission power of other non-zero antenna ports on each non-zero transmitted RE of the other non-zero antenna ports according to the transmission power of the first non-zero antenna port on a non-zero transmitted RE;

Wherein, the other non-zero antenna ports are the non-zero antenna ports of the uplink signal other than the non-zero antenna ports with the maximum number of REs.

Optionally, in the case that there are more than one non-zero antenna ports, the determining, by the terminal, the transmission power of the uplink signal according to the first power scaling coefficient, includes:

determining, by the terminal, the transmission power of each non-zero antenna port on each non-zero transmitted RE of the each non-zero antenna port according to the first power scaling coefficient;

determining, by the terminal, the transmission power of each non-zero antenna port corresponding to the Q sub-bands on each non-zero transmitted RE according to the minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the determining, by the terminal, the transmission power of the uplink signal includes any one of the following:

Determining, by the terminal, the transmission power of the uplink signal in each subband according to the total transmission power of the uplink signal and the number Q of subbands, Q>1;

Determining, by the terminal, the transmission power of the uplink signal of each non-zero antenna port according to the total transmission power of the uplink signal and the number of the non-zero antenna ports, wherein there are more than one non-zero antenna ports.

Optionally, the determining, by the terminal, the transmission power of the uplink signal in each subband according to the total transmission power of the uplink signal and the number Q of subbands, includes:

Dividing, by the terminal, evenly the transmission power of the uplink signal divided into each subband according to the total transmission power of the uplink signal and the number Q of the subbands.

Optionally, the determining, by the terminal, the transmission power of the uplink signal of each non-zero antenna port according to the total transmission power of the uplink signal and the number of non-zero antenna ports, includes any of the following:

Dividing, by the terminal, evenly the transmission power of the uplink signal into each non-zero antenna port according to the total transmission power of the uplink signal and the number of non-zero antenna ports;

Determining, by the terminal, the transmission power of the uplink signal of each non-zero antenna port according to the total transmission power of the uplink signal and the proportion of the number of non-zero antenna ports corresponding to each sub-band to the number of all non-zero antenna ports corresponding to each sub-band;

Determining, by the terminal, the transmission power of the uplink signal of each non-zero antenna port according to the total transmission power of the uplink signal and the proportion of a number of non-zero elements corresponding to non-zero antenna ports in the precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the determining, by the terminal, the transmission power of the uplink signal includes any of the following:

Dividing, by the terminal, evenly the transmission power of the uplink signal into the non-zero antenna ports according to the transmission power of the uplink signal in the Q subbands and the number of non-zero antenna ports corresponding to the Q subbands;

Determining, by the terminal, the transmission power of the uplink signal on each non-zero antenna port corresponding to each subband according to the transmission power of the uplink signal in the Q sub-bands and the proportion of the number of each non-zero antenna port corresponding to the Q sub-bands to the number of all non-zero antenna ports corresponding to the Q sub-bands, Q>1;

Determining, by the terminal, the transmission power of the uplink signal on each non-zero antenna port corresponding to the Q subbands according to the transmission power of the uplink signal in the Q subbands and the proportion of a number of non-zero elements corresponding to each non-zero antenna port included in the precoding matrix corresponding to the Q subbands to a number of all non-zero elements in the precoding matrix.

It should be noted that the network side device embodiment is a network side device corresponding to the above-mentioned method for determining scheduling information applied to a network side device, and all implementations are applicable to the network side device embodiment, and the same technical effect can be achieved, which is not repeated here.

Figure 5:
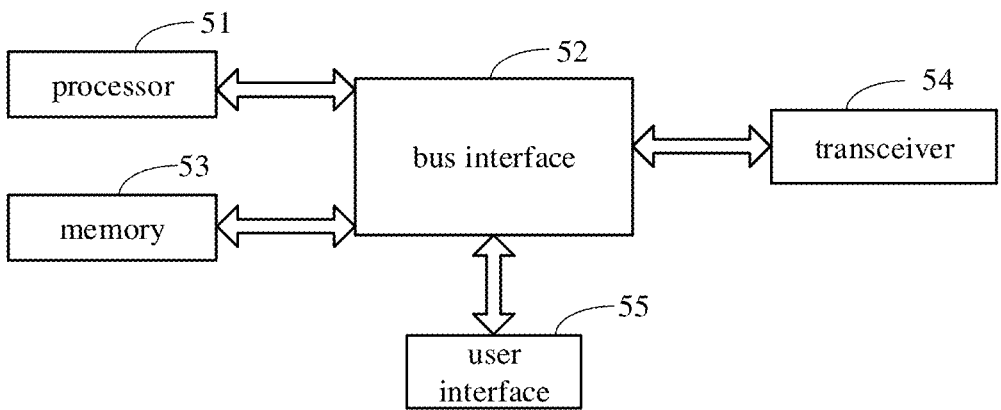
FIG. 5 is a schematic diagram of an implementation structure of a terminal according to some embodiments of the present disclosure.

As shown in FIG. 5, an embodiment of the present disclosure further provides a terminal, including:

a processor 51; and a memory 53 connected to the processor 51 through a bus interface 52, the memory 53 is used to store programs and data used by the processor 51 when performing operations, when the processor 51 calls and executes the programs and data stored in the memory 53, the following processes are executed.

The transceiver 54 is connected to the bus interface 52, and configured to receive and transmit data under the control of the processor 51, specifically:

obtaining scheduling information of an uplink signal, wherein the scheduling information at least indicates related information of Q subbands, Q is a positive integer;

determining a first power scaling coefficient according to the scheduling information;

determining transmission power of the uplink signal according to the first power scaling coefficient.

Optionally, the processor 51 implements the following steps when executing the computer program:

obtaining a transmission power control rule of the uplink signal;

The processor implements the following steps when executing the computer program:

determining the first power scaling coefficient according to the scheduling information and the transmission power control rule of the uplink signal.

Optionally, the processor 51 implements the following steps when executing the computer program:

determining at least one of a precoding matrix, the number of non-zero antenna ports, and the number Q of subbands for non-zero transmission of the uplink signal according to the scheduling information;

determining the first power scaling coefficient according to at least one of the precoding matrix, the number of non-zero antenna ports, and the number Q of subbands.

Optionally, the first power scaling coefficient includes at least one of the power scaling coefficients of the Q subbands and the power scaling coefficients of the uplink signal.

Optionally, when the first power scaling coefficient includes the power scaling coefficient of the Q subbands, the processor 51 implements the following steps when executing the computer program:

determining the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes the power scaling coefficients of the Q subbands, the processor 51 implements the following steps when executing the computer program:

determining the power scaling coefficient of the uplink signal according to the power scaling coefficients of the Q subbands.

Optionally, when Q>1, the processor 51 implements the following steps when executing the computer program:

determining the power scaling coefficient of the uplink signal according to the minimum power scaling coefficient among the power scaling coefficients of the Q subbands; or, determining the power scaling coefficient of the uplink signal according to the power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, the processor 51 implements the following steps when executing the computer program:

determining the power scaling coefficient of the uplink signal according to the minimum number of non-zero antenna ports among the numbers of non-zero antenna ports of the subbands.

Optionally, when there are more than one non-zero antenna ports, the processor 51 implements the following steps when executing the computer program:

determining the first non-zero antenna port according to the first power scaling coefficient and the number of resource elements (REs) corresponding to the non-zero transmission of the uplink signal corresponding to the non-zero antenna ports;

determining the transmission power of the first non-zero antenna port on one non-zero transmitted RE according to the first power scaling coefficient.

Optionally, the processor 51 implements the following steps when executing the computer program:

determining the transmission power of the first non-zero antenna port on all non-zero transmitted REs of the first non-zero antenna port according to the transmission power of the first non-zero antenna port on a non-zero transmitted RE; or, determining the transmission power of other non-zero antenna ports on each non-zero transmitted RE of the other non-zero antenna ports according to the transmission power of the first non-zero antenna port on a non-zero transmitted RE;

Wherein, the other non-zero antenna ports are the non-zero antenna ports of the uplink signal other than the non-zero antenna ports with the maximum number of REs.

Optionally, when there are more than one non-zero antenna ports, the processor 51 implements the following steps when executing the computer program:

determining the transmission power of each non-zero antenna port on each non-zero transmitted RE of the each non-zero antenna port according to the first power scaling coefficient;

determining the transmission power of each non-zero antenna port corresponding to the Q sub-bands on each non-zero transmitted RE according to the minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the processor 51 implements any one of the following steps when executing the computer program:

determining the transmission power of the uplink signal in each subband according to the total transmission power of the uplink signal and the number Q of subbands, Q>1;

determining the transmission power of the uplink signal of each non-zero antenna port according to the total transmission power of the uplink signal and the number of the non-zero antenna ports, wherein there are more than one non-zero antenna ports.

Optionally, the processor 51 implements the following steps when executing the computer program:

dividing evenly the transmission power of the uplink signal divided into each subband according to the total transmission power of the uplink signal and the number Q of the subbands;

When the processor executes implements the following steps when executing the computer program:

dividing evenly the transmission power of the uplink signal into each non-zero antenna port according to the total transmission power of the uplink signal and the number of non-zero antenna ports;

determining the transmission power of the uplink signal of each non-zero antenna port according to the total transmission power of the uplink signal and the proportion of the number of non-zero antenna ports corresponding to each sub-band to the number of all non-zero antenna ports corresponding to each sub-band;

determining the transmission power of the uplink signal of each non-zero antenna port according to the total transmission power of the uplink signal and the proportion of a number of non-zero elements corresponding to non-zero antenna ports in the precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the processor 51 executes implements the following steps when executing the computer program:

dividing evenly the transmission power of the uplink signal into the non-zero antenna ports according to the transmission power of the uplink signal in the Q subbands and the number of non-zero antenna ports corresponding to the Q subbands;

determining the transmission power of the uplink signal on each non-zero antenna port corresponding to each subband according to the transmission power of the uplink signal in the Q sub-bands and the proportion of the number of each non-zero antenna port corresponding to the Q sub-bands to the number of all non-zero antenna ports corresponding to the Q sub-bands, Q>1;

determining the transmission power of the uplink signal on each non-zero antenna port corresponding to the Q subbands according to the transmission power of the uplink signal in the Q subbands and the proportion of a number of non-zero elements corresponding to each non-zero antenna port included in the precoding matrix corresponding to the Q subbands to a number of all non-zero elements in the precoding matrix.

It should be noted that the terminal embodiment is a terminal corresponding to the above-mentioned method for determining uplink power applied to the terminal, and all the implementation are applicable to the terminal embodiment, and can also achieve the same technical effect, which is not repeated here.

It should be noted that, in FIG. 5, the bus architecture may include any number of interconnected buses and bridges, specifically, various circuits of one or more processors represented by the processor 51 and the memory represented by the memory 53 are linked together. The bus architecture may also link together various other circuits, such as peripherals, voltage regulators, and power management circuits, which are well known in the art and, therefore, will not be described further herein. The bus interface provides the interface. Transceiver 54 may be a number of elements, including transmitters and transceivers that provide means for communicating with various other devices over a transmission medium. For different terminals, the user interface 55 may also be an interface capable of externally connecting required devices, and the connected devices include but are not limited to keypads, displays, speakers, microphones, joysticks, and the like. The processor 51 is responsible for managing the bus architecture and general processing, and the memory 53 may store data used by the processor 51 when performing operations.

Those skilled in the art can understand that all or part of the steps of implementing the above embodiments can be completed by hardware, or can be completed by instructing relevant hardware through a computer program, the computer program includes instructions for executing part or all of the steps of the above method; and the computer program can be stored in a readable storage medium, and the storage medium can be any form of storage medium.

Figure 6:
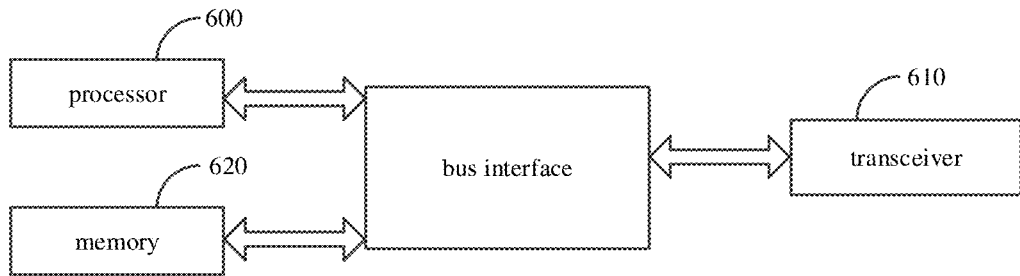
FIG. 6 is a schematic diagram of an implementation structure of a network side device according to some embodiments of the present disclosure.

As shown in FIG. 6, an embodiment of the present disclosure further provides a network side device, including: a processor 600; a memory 620 connected to the processor 600 through a bus interface, and a transceiver 610 connected to the processor 600 through a bus interface; the memory 620 is used to store programs and data used by the processor when performing operations; data information or pilot frequency is sent through the transceiver 610, and uplink control channel is also received through the transceiver 610; when the processor 600 calls and executes the program and data stored in the memory 620, the following functional modules are implemented.

The processor 600 is configured to read the program in the memory 620 and perform the following:

determining scheduling information of an uplink signal according to a preset transmission power control rule of the uplink signal, wherein the scheduling information at least indicates related information of Q subbands, where Q is a positive integer;

transmitting the scheduling information to a terminal;

The transmission power control rule of the uplink signal includes:

Determining, by the terminal, a first power scaling coefficient according to the scheduling information;

Determining, by the terminal, the transmission power of the uplink signal according to the first power scaling coefficient.

The transceiver 610 is used for receiving and transmitting data under the control of the processor 600.

Optionally, when the processor 600 executes the computer program, any one of the following steps is implemented:

transmitting the transmission power control rule of the uplink signal to the terminal;

The determining, by the terminal, the first power scaling coefficient according to the scheduling information, includes:

Determining, by the terminal, the first power scaling coefficient according to the scheduling information and the transmission power control rule of the uplink signal.

Optionally, the determining, by the terminal, the first power scaling coefficient according to the scheduling information, includes:

Determining, by the terminal, at least one of a precoding matrix, a number of non-zero antenna ports, and a number Q of subbands for non-zero transmission of the uplink signal according to the scheduling information;

Determining, by the terminal, the first power scaling coefficient according to at least one of the precoding matrix, the number of non-zero antenna ports, and the number Q of subbands.

Optionally, the first power scaling coefficient includes at least one of the power scaling coefficients of the Q subbands and the power scaling coefficient of the uplink signal.

Optionally, in the case that the first power scaling coefficient includes the power scaling coefficients of Q subbands, determining the first power scaling coefficient according to at least one of the precoding matrix, the number of non-zero antenna ports, and the number Q of subbands includes:

Determining the power scaling coefficients of the Q subbands according to any one of the following formulas:

$$\beta_{sub}=N/M/M_{sub}$$

$$\beta_{sub}=1/M_{sub}$$

$$\beta_{sub}=N/M$$

$$\beta_{sub}=N/M_{sub}$$

Wherein, $\beta_{sub}$ is the power scaling coefficient of the Q subbands;

N is the number of non-zero antenna ports;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

Optionally, in the case that the first power scaling coefficient includes the power scaling coefficients of the Q subbands, according to at least one of the precoding matrix, the number of non-zero antenna ports, and the number of subbands Q, after determining the first power scaling coefficient, the transmission power control rule for the uplink signal further includes:

Determining, by the terminal, the power scaling coefficient of the uplink signal according to the power scaling coefficients of the Q subbands.

Optionally, when Q>1, the determining, by the terminal, the power scaling coefficient of the uplink signal according to the power scaling coefficients of the Q subbands includes:

Determining, by the terminal, the power scaling coefficient of the uplink signal according to the minimum power scaling coefficient among the power scaling coefficients of the Q subbands; or, Determining, by the terminal, the power scaling coefficient of the uplink signal according to the power scaling coefficient of a specific subband in the Q subbands.

Optionally, in the case that the first power scaling coefficient includes the power scaling coefficient of the uplink signal, and Q>1, and the number of non-zero antenna ports is the number of non-zero antenna ports of each subband, determining the first power scaling coefficient according to at least one of the precoding matrix, the number of non-zero antenna ports, and the number Q of subbands includes:

Determining, by the terminal, the power scaling coefficient of the uplink signal according to the minimum number of non-zero antenna ports among the numbers of non-zero antenna ports of the subbands.

Optionally, when there are more than one non-zero antenna ports, the determining, by the terminal, the transmission power of the uplink signal according to the first power scaling coefficient includes:

Determining, by the terminal, the first non-zero antenna port according to the first power scaling coefficient and the number of resource elements (Res) corresponding to the non-zero transmission of the uplink signal corresponding to the non-zero antenna ports;

Determining, by the terminal, the transmission power of the first non-zero antenna port on one non-zero transmitted RE according to the first power scaling coefficient.

Optionally, after determining the transmission power of the first non-zero antenna port on a non-zero transmitted RE, the determining, by the terminal, the transmission power of the uplink signal further includes:

determining, by the terminal, the transmission power of the first non-zero antenna port on all non-zero transmitted REs of the first non-zero antenna port according to the transmission power of the first non-zero antenna port on a non-zero transmitted RE; or, determining, by the terminal, the transmission power of other non-zero antenna ports on each non-zero transmitted RE of the other non-zero antenna ports according to the transmission power of the first non-zero antenna port on a non-zero transmitted RE;

Wherein, the other non-zero antenna ports are the non-zero antenna ports of the uplink signal other than the non-zero antenna ports with the maximum number of REs.

Optionally, in the case that there are more than one non-zero antenna ports, the determining, by the terminal, the transmission power of the uplink signal according to the first power scaling coefficient, includes:

determining, by the terminal, the transmission power of each non-zero antenna port on each non-zero transmitted RE of the each non-zero antenna port according to the first power scaling coefficient;

determining, by the terminal, the transmission power of each non-zero antenna port corresponding to the Q sub-bands on each non-zero transmitted RE according to the minimum transmission power among the transmission power of each non-zero antenna port corresponding to each sub-band in the Q sub-bands on each non-zero transmitted RE.

Optionally, in the case that the transmission power of the uplink signal includes the total transmission power of the uplink signal, the determining, by the terminal, the transmission power of the uplink signal includes any one of the following:

Determining, by the terminal, the transmission power of the uplink signal in each subband according to the total transmission power of the uplink signal and the number Q of subbands, Q>1;

Determining, by the terminal, the transmission power of the uplink signal of each non-zero antenna port according to the total transmission power of the uplink signal and the number of the non-zero antenna ports, wherein there are more than one non-zero antenna ports.

Optionally, the determining, by the terminal, the transmission power of the uplink signal in each subband according to the total transmission power of the uplink signal and the number Q of subbands, includes:

Dividing, by the terminal, evenly the transmission power of the uplink signal divided into each subband according to the total transmission power of the uplink signal and the number Q of the subbands.

Optionally, the determining, by the terminal, the transmission power of the uplink signal of each non-zero antenna port according to the total transmission power of the uplink signal and the number of non-zero antenna ports, includes any of the following:

Dividing, by the terminal, evenly the transmission power of the uplink signal into each non-zero antenna port according to the total transmission power of the uplink signal and the number of non-zero antenna ports;

Determining, by the terminal, the transmission power of the uplink signal of each non-zero antenna port according to the total transmission power of the uplink signal and the proportion of the number of non-zero antenna ports corresponding to each sub-band to the number of all non-zero antenna ports corresponding to each sub-band;

Determining, by the terminal, the transmission power of the uplink signal of each non-zero antenna port according to the total transmission power of the uplink signal and the proportion of a number of non-zero elements corresponding to non-zero antenna ports in the precoding matrix corresponding to each sub-band to a number of all non-zero elements in the precoding matrix.

Optionally, in the case that the transmission power of the uplink signal includes the transmission power of the uplink signal in Q subbands, and there are more than one non-zero antenna ports, the determining, by the terminal, the transmission power of the uplink signal includes any of the following:

Dividing, by the terminal, evenly the transmission power of the uplink signal into the non-zero antenna ports according to the transmission power of the uplink signal in the Q subbands and the number of non-zero antenna ports corresponding to the Q subbands;

Determining, by the terminal, the transmission power of the uplink signal on each non-zero antenna port corresponding to each subband according to the transmission power of the uplink signal in the Q sub-bands and the proportion of the number of each non-zero antenna port corresponding to the Q sub-bands to the number of all non-zero antenna ports corresponding to the Q sub-bands, Q>1;

Determining, by the terminal, the transmission power of the uplink signal on each non-zero antenna port corresponding to the Q subbands according to the transmission power of the uplink signal in the Q subbands and the proportion of a number of non-zero elements corresponding to each non-zero antenna port included in the precoding matrix corresponding to the Q subbands to a number of all non-zero elements in the precoding matrix.

It should be noted that this network side device embodiment is a network side device corresponding to the above-mentioned method for determining scheduling information applied to a network side device, and all implementations of the above-mentioned embodiments are applicable to this network side device embodiment, and also same technical effect can be achieved, which is not repeated here.

In FIG. 6, the bus architecture may include any number of interconnected buses and bridges, specifically various circuits of one or more processors represented by processor 600 and memory represented by memory 620 are linked together. The bus architecture may also link together various other circuits, such as peripherals, voltage regulators, and power management circuits, which are well known in the art and, therefore, will not be described further herein. The bus interface provides the interface. Transceiver 610 may be a number of elements, including a transmitter and a transceiver, providing a means for communicating with various other devices over a transmission medium. The processor 600 is responsible for managing the bus architecture and general processing, and the memory 620 may store data used by the processor 600 in performing operations.

Those skilled in the art can understand that all or part of the steps of implementing the above embodiments can be completed by hardware, or can be completed by instructing relevant hardware through a computer program, where the computer program includes instructions for executing part or all of the steps of the above method; and the computer program can be stored in a readable storage medium, and the storage medium can be any form of storage medium.

Each module, unit, sub-unit or sub-module may be one or more integrated circuits configured to implement the above method, for example: one or more application specific integrated circuits (ASIC), or, one or more digital signal processor (DSP), or, one or more field programmable gate arrays (FPGA), etc. For another example, when one of the above modules is implemented in the form of a processing element scheduling the program code, the processing element may be a general-purpose processor, such as a central processing unit (CPU) or other processors that can invoke program codes. For another example, these modules can be integrated together and implemented in the form of a system-on-a-chip (SOC).

In addition, it should be pointed out that, in the apparatus and method of the present disclosure, obviously, each component or each step can be decomposed and/or recombined. These decomposition and/or recombination should be considered equivalents of the present disclosure. Also, the steps of performing the above-mentioned series of processes can naturally be performed in chronological order, but need not necessarily be performed in chronological order, and some steps can be performed in parallel or independently of each other. Those of ordinary skill in the art can understand that all or any steps or components of the method and device of the present disclosure can be implemented in any computing device (including a processor, storage medium, etc.) or a network of computing devices in hardware, firmware, etc., software, or a combination thereof, which can be implemented by those of ordinary skill in the art using their basic programming skills after reading the description of the present disclosure.

Accordingly, the objects of the present disclosure can also be achieved by running a program or set of programs on any computing device. The computing device may be a known general purpose device. Therefore, the objects of the present disclosure can also be achieved merely by providing a program product containing program code for implementing the method or apparatus. That is, such a program product also constitutes the present disclosure, and a storage medium in which such a program product is stored also constitutes the present disclosure. Obviously, the storage medium can be any known storage medium or any storage medium developed in the future. It should also be pointed out that, in the apparatus and method of the present disclosure, obviously, each component or each step can be decomposed and/or recombined. These decomposition and/or recombination should be considered equivalents of the present disclosure. Also, the steps of executing the above-described series of processes can naturally be executed in chronological order, but need not necessarily be executed in chronological order. Certain steps may be performed in parallel or independently of each other.

The above are optional embodiments of the present disclosure. It should be pointed out that for those skilled in the art, several improvements and modifications can be made without departing from the principles described in the present disclosure. These improvements and modifications should also be fall in the protection scope of the present disclosure.

What is claimed is:

1. A method for determining uplink power, performed by a terminal, comprising:

receiving scheduling information of an uplink signal, wherein the scheduling information at least indicates related information of Q subbands, Q is a positive integer;

determining a first power scaling coefficient according to the scheduling information;

determining transmission power of the uplink signal according to the first power scaling coefficient;

wherein the determining a first power scaling coefficient according to the scheduling information comprises:

determining at least one of a precoding matrix, a number of non-zero antenna ports, or a number Q of subbands for non-zero transmission of the uplink signal according to the scheduling information;

determining the first power scaling coefficient according to at least one of the precoding matrix, the number of non-zero antenna ports, or the number Q of subbands;

wherein the number of non-zero antenna ports is N, and N>1;

wherein the related information of Q subbands comprises at least one of:

a precoding matrix corresponding to the Q subbands, the number of transmission layers corresponding to the Q subbands, or SRS resource indication information corresponding to the Q subbands;

wherein, the determining the transmission power of the uplink signal according to the first power scaling coefficient comprises at least one of:

determining a first non-zero antenna port according to the first power scaling coefficient and a number of resource elements (REs) for the non-zero transmission of the uplink signal corresponding to the non-zero antenna ports; determining transmission power of the first non-zero antenna port on one non-zero transmitted RE according to the first power scaling coefficient, or determining the transmission power of each non-zero antenna port on each non-zero transmitted RE of the each non-zero antenna port according to the first power scaling coefficient; determining the transmission power of each non-zero antenna port corresponding to the Q sub-bands on each non-zero transmitted RE, according to a minimum transmission power among the transmission power of each non-zero antenna port corresponding to each sub-band in the Q sub-bands on each non-zero transmitted RE;

and/or wherein, in the case that the transmission power of the uplink signal includes the total transmission power of the uplink signal, the determining the transmission power of the uplink signal further comprises any one of the following:

determining transmission power of the uplink signal in each subband according to the total transmission power of the uplink signal and the number Q of subbands, wherein Q>1; or determining transmission power of the uplink signal of each non-zero antenna port, according to the total transmission power of the uplink signal and the number of the non-zero antenna ports, and/or wherein, in the case that the transmission power of the uplink signal includes the transmission power of the uplink signal in Q subbands, the determining the transmission power of the uplink signal includes any of the following:

dividing evenly the transmission power of the uplink signal into the non-zero antenna ports according to the transmission power of the uplink signal in the Q subbands and the number of non-zero antenna ports corresponding to the Q subbands;

determining the transmission power of the uplink signal of each non-zero antenna port corresponding to each subband according to the transmission power of the uplink signal in the Q sub-bands and a proportion of a number of each non-zero antenna port corresponding to the Q sub-bands to a number of all non-zero antenna ports corresponding to the Q sub-bands, wherein Q>1;

determining the transmission power of the uplink signal of each non-zero antenna port corresponding to the Q subbands according to the transmission power of the uplink signal in the Q subbands and a proportion of a number of non-zero elements corresponding to each non-zero antenna port included in a precoding matrix corresponding to the Q subbands to a number of all non-zero elements in the precoding matrix;

wherein the determining the transmission power of the uplink signal of each non-zero antenna port according to the total transmission power of the uplink signal and the number of non-zero antenna ports, includes any one of the following:

dividing evenly the transmission power of the uplink signal into each non-zero antenna port according to the total transmission power of the uplink signal and the number of non-zero antenna ports;

determining the transmission power of the uplink signal of each non-zero antenna port according to the total transmission power of the uplink signal and a proportion of a number of non-zero antenna ports corresponding to each sub-band to a number of all non-zero antenna ports corresponding to each sub-band;

determining the transmission power of the uplink signal of each non-zero antenna port according to the total transmission power of the uplink signal and a proportion of a number of non-zero elements corresponding to each non-zero antenna port in a precoding matrix corresponding to each sub-band to a number of all non-zero elements in the precoding matrix.

2. The method according to claim 1, wherein before the receiving scheduling information of an uplink signal, the method further comprises:

determining a transmission power control rule of the uplink signal;

the determining a first power scaling coefficient according to the scheduling information includes:

determining the first power scaling coefficient according to the scheduling information and the transmission power control rule of the uplink signal.

3. The method according to claim 1, wherein the first power scaling coefficient includes at least one of power scaling coefficients of the Q subbands and a power scaling coefficient of the uplink signal.

4. The method according to claim 3, wherein in the case that the first power scaling coefficient includes the power scaling coefficients of the Q subbands, the determining the first power scaling coefficient according to at least one of the precoding matrix, the number of non-zero antenna ports, or the number Q of subbands includes:

determining the power scaling coefficient of the Q subbands according to any one of the following formulas:

$$\beta_{sub} = \frac{\frac{N}{M}}{M_{sub}}$$

$$\beta_{sub} = \frac{1}{M_{sub}}$$

$$\beta_{sub} = \frac{N}{M}$$

$$\beta_{sub} = \frac{N}{M_{sub}}$$

wherein, $\beta_{sub}$ is the power scaling coefficient of the Q subbands;

$M_{sub}$ is the number of subbands;

M is one of a maximum number of sounding reference signal (SRS)ports included in one SRS resource supported by the terminal, a number of SRS ports included in an SRS resource indicated by the SRS resource indication (SRI), a number of SRS ports included in an SRS resource corresponding to a transmission mode of the uplink signal, a maximum number of antenna ports supported by uplink signal transmission, or a number of antenna ports corresponding to the uplink signal transmission.

5. The method according to claim 3, wherein, in the case that the first power scaling coefficient includes power scaling coefficients of the Q subbands, after determining the first power scaling coefficient according to at least one of the precoding matrix, the number of non-zero antenna ports, or the number Q of subbands, the method further includes:

determining the power scaling coefficient of the uplink signal according to the power scaling coefficients of the Q subbands.

6. The method according to claim 5, wherein, when Q>1, the determining the power scaling coefficient of the uplink signal according to the power scaling coefficients of the Q subbands comprises:

determining the power scaling coefficient of the uplink signal according to a minimum power scaling coefficient among the power scaling coefficients of the Q subbands; or, determining the power scaling coefficient of the uplink signal according to a power scaling coefficient of a specific subband in the Q subbands.

7. The method according to claim 3, wherein in the case that the first power scaling coefficient includes the power scaling coefficient of the uplink signal, and Q>1, and the number of non-zero antenna ports is the number of non-zero antenna ports of each subband, the determining the first power scaling coefficient according to at least one of the precoding matrix, the number of non-zero antenna ports, or the number Q of subbands includes:

determining the power scaling coefficient of the uplink signal according to a minimum number of non-zero antenna ports among the numbers of non-zero antenna ports of the subbands.

8. The method according to claim 1, wherein after determining transmission power of the first non-zero antenna port on one non-zero transmitted RE, the determining the transmission power of the uplink signal further comprises:

determining the transmission power of the first non-zero antenna port on all non-zero transmitted REs of the first non-zero antenna port, according to the transmission power of the first non-zero antenna port on one non-zero transmitted RE; or, determining transmission power of other non-zero antenna ports on each non-zero transmitted RE of the other non-zero antenna ports, according to the transmission power of the first non-zero antenna port on one non-zero transmitted RE;

wherein, the other non-zero antenna ports are non-zero antenna ports other than the non-zero antenna port with the maximum number of REs.

9. The method according to claim 1, wherein the determining the transmission power of the uplink signal in each subband according to the total transmission power of the uplink signal and the number Q of subbands comprises:

dividing evenly the transmission power of the uplink signal into each subband according to the total transmission power of the uplink signal and the number Q of the subbands.

10. A method for determining scheduling information, performed by a network side device, comprising:

determining scheduling information of an uplink signal according to a preset transmission power control rule of the uplink signal, wherein the scheduling information at least indicates related information of Q subbands, Q is a positive integer;

51 transmitting the scheduling information to a terminal;
the transmission power control rule of the uplink signal
includes:
determining, by the terminal, a first power scaling coef-
ficient according to the scheduling information;
determining, by the terminal, transmission power of the
uplink signal according to the first power scaling coef-
ficient;
wherein the determining, by the terminal, the first power
scaling coefficient according to the scheduling information, comprises:
determining, by the terminal, at least one of a precoding
matrix, a number of non-zero antenna ports, or a
number Q of subbands for non-zero transmission of the
uplink signal according to the scheduling information;
determining, by the terminal, the first power scaling
coefficient according to at least one of the precoding
matrix, the number of non-zero antenna ports, or the
number Q of subbands;
wherein the number of non-zero antenna ports is N, and N>1;
wherein the related information of Q subbands comprises
at least one of:
a precoding matrix corresponding to the Q subbands,
the number of transmission layers corresponding to the
Q subbands, or
SRS resource indication information corresponding to
the Q subbands;
wherein, the determining, by the terminal, the trans-
mission power of the uplink signal according to the
first power scaling coefficient comprises at least one
of:
determining, by the terminal, a first non-zero antenna
port according to the first power scaling coefficient
and a number of resource elements (REs) for the
non-zero transmission of the uplink signal corre-
sponding to the non-zero antenna ports; determining,
by the terminal, transmission power of the first
non-zero antenna port on one non-zero transmitted
RE according to the first power scaling coefficient;
or
determining, by the terminal, the transmission power of
each non-zero antenna port on each non-zero trans-
mitted RE of the each non-zero antenna port accord-
ing to the first power scaling coefficient; determining, by the terminal, the transmission power of each
non-zero antenna port corresponding to the Q sub-
bands on each non-zero transmitted RE, according to
a minimum transmission power among the transmis-
sion power of each non-zero antenna port corresponding to each sub-band in the Q sub-bands on
each non-zero transmitted RE;
and/or
wherein, in the case that the transmission power of the
uplink signal includes the total transmission power
of the uplink signal, the determining, by the terminal,
the transmission power of the uplink signal includes
any one of the following:
determining, by the terminal, transmission power of the
uplink signal in each subband according to the total
transmission power of the uplink signal and the
number Q of subbands, wherein Q>1; or
determining, by the terminal, transmission power of the
uplink signal of each non-zero antenna port accord-
ing to the total transmission power of the uplink
signal and the number of the non-zero antenna ports;
and/or

52 wherein, in the case that the transmission power of the
uplink signal includes the transmission power of the
uplink signal in Q subbands, the determining, by the
terminal, the transmission power of the uplink signal
includes any of the following:
dividing, by the terminal, evenly the transmission
power of the uplink signal into the non-zero antenna
ports according to the transmission power of the
uplink signal in the Q subbands and the number of
non-zero antenna ports corresponding to the Q sub-
bands;
determining, by the terminal, the transmission power of
the uplink signal of each non-zero antenna port
corresponding to each subband according to the
transmission power of the uplink signal in the Q
sub-bands and a proportion of a number of each
non-zero antenna port corresponding to the Q sub-
bands to a number of all non-zero antenna ports
corresponding to the Q sub-bands, wherein Q>1;
determining, by the terminal, the transmission power of
the uplink signal of each non-zero antenna port
corresponding to the Q subbands according to the
transmission power of the uplink signal in the Q
subbands and a proportion of a number of non-zero
elements corresponding to each non-zero antenna
port included in a precoding matrix corresponding to
the Q subbands to a number of all non-zero elements
in the precoding matrix;
wherein the determining, by the terminal, the transmis-
sion power of the uplink signal of each non-zero
antenna port according to the total transmission
power of the uplink signal and the number of non-
zero antenna ports, includes any one of the follow-
ing:
dividing, by the terminal, evenly the transmission
power of the uplink signal into each non-zero
antenna port according to the total transmission
power of the uplink signal and the number of non-
zero antenna ports;
determining, by the terminal, the transmission power of
the uplink signal of each non-zero antenna port
according to the total transmission power of the
uplink signal and a proportion of a number of
non-zero antenna ports corresponding to each sub-
band to a number of all non-zero antenna ports
corresponding to each sub-band;
determining, by the terminal, the transmission power of
the uplink signal of each non-zero antenna port
according to the total transmission power of the
uplink signal and a proportion of a number of
non-zero elements corresponding to each non-zero
antenna port in a precoding matrix corresponding to
each sub-band to a number of all non-zero elements
in the precoding matrix.
11. The method according to claim 10, wherein before
transmitting the scheduling information to the terminal, the
method further includes:
transmitting the transmission power control rule of the
uplink signal to the terminal;
the determining, by the terminal, the first power scaling
coefficient according to the scheduling information,
includes:
determining, by the terminal, the first power scaling
coefficient according to the scheduling information and
the transmission power control rule of the uplink sig-
nal.

12. The method according to claim 10, wherein the first power scaling coefficient includes at least one of power scaling coefficients of the Q subbands and a power scaling coefficient of the uplink signal.

13. A terminal, comprising: a transceiver, a memory, a processor, and a computer program stored in the memory and executed by the processor, wherein the processor implements the following steps when executing the computer program:

receiving scheduling information of an uplink signal, wherein the scheduling information at least indicates related information of Q subbands, Q is a positive integer;

determining a first power scaling coefficient according to the scheduling information;

determining transmission power of the uplink signal according to the first power scaling coefficient;

wherein the determining a first power scaling coefficient according to the scheduling information comprises:

determining at least one of a precoding matrix, a number of non-zero antenna ports, or a number Q of subbands for non-zero transmission of the uplink signal according to the scheduling information;

determining the first power scaling coefficient according to at least one of the precoding matrix, the number of non-zero antenna ports, or the number Q of subbands;

wherein the number of non-zero antenna ports is N, and N>1;

wherein the related information of Q subbands comprises at least one of:

a precoding matrix corresponding to the Q subbands, the number of transmission layers corresponding to the Q subbands, or SRS resource indication information corresponding to the Q subbands;

wherein, the determining the transmission power of the uplink signal according to the first power scaling coefficient comprises at least one of:

determining a first non-zero antenna port according to the first power scaling coefficient and a number of resource elements (REs) for the non-zero transmission of the uplink signal corresponding to the non-zero antenna ports; determining transmission power of the first non-zero antenna port on one non-zero transmitted RE according to the first power scaling coefficient, or determining the transmission power of each non-zero antenna port on each non-zero transmitted RE of the each non-zero antenna port according to the first power scaling coefficient; determining the transmission power of each non-zero antenna port corresponding to the Q sub-bands on each non-zero transmitted RE, according to a minimum transmission power among the transmission power of each non-zero antenna port corresponding to each sub-band in the Q sub-bands on each non-zero transmitted RE;

and/or wherein, in the case that the transmission power of the uplink signal includes the total transmission power of the uplink signal, the determining the transmission power of the uplink signal further comprises any one of the following:

determining transmission power of the uplink signal in each subband according to the total transmission power of the uplink signal and the number Q of subbands, wherein Q>1; or determining transmission power of the uplink signal of each non-zero antenna port, according to the total transmission power of the uplink signal and the number of the non-zero antenna ports, and/or wherein, in the case that the transmission power of the uplink signal includes the transmission power of the uplink signal in Q subbands, the determining the transmission power of the uplink signal includes any of the following:

dividing evenly the transmission power of the uplink signal into the non-zero antenna ports according to the transmission power of the uplink signal in the Q subbands and the number of non-zero antenna ports corresponding to the Q subbands;

determining the transmission power of the uplink signal of each non-zero antenna port corresponding to each subband according to the transmission power of the uplink signal in the Q sub-bands and a proportion of a number of each non-zero antenna port corresponding to the Q sub-bands to a number of all non-zero antenna ports corresponding to the Q sub-bands, wherein Q>1;

determining the transmission power of the uplink signal of each non-zero antenna port corresponding to the Q subbands according to the transmission power of the uplink signal in the Q subbands and a proportion of a number of non-zero elements corresponding to each non-zero antenna port included in a precoding matrix corresponding to the Q subbands to a number of all non-zero elements in the precoding matrix;

wherein the determining the transmission power of the uplink signal of each non-zero antenna port according to the total transmission power of the uplink signal and the number of non-zero antenna ports, includes any one of the following:

dividing evenly the transmission power of the uplink signal into each non-zero antenna port according to the total transmission power of the uplink signal and the number of non-zero antenna ports;

determining the transmission power of the uplink signal of each non-zero antenna port according to the total transmission power of the uplink signal and a proportion of a number of non-zero antenna ports corresponding to each sub-band to a number of all non-zero antenna ports corresponding to each sub-band;

determining the transmission power of the uplink signal of each non-zero antenna port according to the total transmission power of the uplink signal and a proportion of a number of non-zero elements corresponding to each non-zero antenna port in a precoding matrix corresponding to each sub-band to a number of all non-zero elements in the precoding matrix.

14. A network side device, comprising: a transceiver, a memory, a processor, and a computer program stored in the memory and executed by the processor, wherein the processor implements the following steps of the method for determining scheduling information according to claim 10.

* * * * *